US012410300B2

(12) United States Patent
Ma et al.

(10) Patent No.: US 12,410,300 B2
(45) Date of Patent: Sep. 9, 2025

(54) COMPOSITIONS CONTAINING THERMALLY CONDUCTIVE FILLERS

(71) Applicant: PPG Industries Ohio, Inc., Cleveland, OH (US)

(72) Inventors: Liang Ma, Allison Park, PA (US); Allison G. Condie, Valencia, PA (US); Marvin M. Pollum, Jr., Pittsburgh, PA (US); Lorraine Hsu, Allison Park, PA (US); Maria S. French, Maidenhead (GB); Calum H. Munro, Gibsonia, PA (US); Shuyu Fang, Boise, ID (US); Masayuki Nakajima, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 681 days.

(21) Appl. No.: 17/284,645

(22) PCT Filed: Oct. 14, 2019

(86) PCT No.: PCT/US2019/056080
§ 371 (c)(1),
(2) Date: Apr. 12, 2021

(87) PCT Pub. No.: WO2020/077333
PCT Pub. Date: Apr. 16, 2020

(65) Prior Publication Data
US 2021/0395483 A1 Dec. 23, 2021

Related U.S. Application Data

(60) Provisional application No. 62/894,908, filed on Sep. 2, 2019, provisional application No. 62/745,006, filed on Oct. 12, 2018.

(51) Int. Cl.
*C08K 9/10* (2006.01)
*C08K 3/013* (2018.01)
*C08L 63/00* (2006.01)

(52) U.S. Cl.
CPC ............ *C08K 3/013* (2018.01); *C08K 9/10* (2013.01); *C08L 63/00* (2013.01); *C08K 2201/001* (2013.01)

(58) Field of Classification Search
CPC .... C08K 3/013; C08K 9/10; C08K 2201/001; C08K 2003/0843; C08K 2201/005; C08K 3/08; C08K 3/38; C08K 2003/222; C08K 3/22; C08K 2003/2227; C08K 2003/385; C08L 63/00; C08L 75/04; Y02E 60/10; H01M 10/6551
USPC ...................................................... 524/401
See application file for complete search history.

(56) References Cited

U.S. PATENT DOCUMENTS

| | | | |
|---|---|---|---|
| 2,466,963 A | 4/1949 | Patrick et al. | |
| 4,623,711 A | 11/1986 | Morris et al. | |
| 4,793,867 A | 12/1988 | Charles et al. | |
| 5,588,989 A | 12/1996 | Vonk et al. | |
| 6,509,418 B1 | 1/2003 | Zook et al. | |
| 7,749,368 B2 | 7/2010 | McMurdie et al. | |
| 7,858,703 B2 | 12/2010 | Zook et al. | |
| 8,673,091 B2 | 3/2014 | McMillen et al. | |
| 8,796,361 B2 | 8/2014 | Asay et al. | |
| 8,901,256 B2 | 12/2014 | Pajel et al. | |
| 9,425,373 B2 | 8/2016 | Aketa et al. | |
| 9,562,175 B2 | 2/2017 | Asay et al. | |
| 10,050,244 B2 | 8/2018 | Lin et al. | |
| 10,205,203 B2 | 2/2019 | Yao et al. | |
| 10,236,489 B2 | 3/2019 | Chen et al. | |
| 10,263,304 B2 | 4/2019 | Li | |
| 10,297,884 B2 | 5/2019 | Li et al. | |
| 10,522,886 B2 | 12/2019 | Li et al. | |
| 10,686,171 B2 | 6/2020 | Chen et al. | |
| 11,005,131 B2 | 5/2021 | Zhou et al. | |
| 2003/0064017 A1 | 4/2003 | Tobita et al. | |
| 2006/0058451 A1 | 3/2006 | Gommans et al. | |
| 2008/0007890 A1* | 1/2008 | Harmon | H01L 23/42 361/321.5 |
| 2011/0027565 A1 | 2/2011 | Matsumoto et al. | |
| 2012/0129980 A1 | 5/2012 | Desai et al. | |
| 2012/0228542 A1 | 9/2012 | L'Abee et al. | |
| 2015/0125646 A1 | 5/2015 | Tournilhac et al. | |
| 2015/0140411 A1 | 5/2015 | Li et al. | |
| 2016/0008363 A1 | 1/2016 | Walker et al. | |
| 2016/0333133 A1 | 11/2016 | Rukavina | |
| 2017/0012259 A1 | 1/2017 | Lin et al. | |
| 2017/0066899 A1* | 3/2017 | Nakajima | C08G 59/5033 |
| 2017/0222285 A1 | 8/2017 | Li et al. | |

(Continued)

FOREIGN PATENT DOCUMENTS

| CN | 102260413 A | 11/2011 |
|---|---|---|
| CN | 104789175 A | 7/2015 |

(Continued)

OTHER PUBLICATIONS

Kukdo Epoxy Brochure, pp. 6-31, Distributed by Triiso.

*Primary Examiner* — Hannah J Pak
(74) *Attorney, Agent, or Firm* — Alicia M. Passerin; Ashley N. Crane

(57) ABSTRACT

Disclosed is a composition comprising an electrophile, a nucleophile, and a thermally conductive filler package. The filler package may comprise thermally conductive, electrically insulative filler particles that may have a thermal conductivity of at least 5 W/m·K (measured according to ASTM D7984) and a volume resistivity of at least 10 Ω·m (measured according to ASTM D257, C611, or B193) and that may be present in an amount of at least 90% by volume based on total volume of the filler package. The thermally conductive filler package may be present in an amount of at least 10% by volume percent based on total volume of the composition. The present invention also is directed to a method for treating a substrate and to substrates comprising a layer formed from a compositions disclosed herein.

20 Claims, 2 Drawing Sheets

(56) References Cited

U.S. PATENT DOCUMENTS

| | | |
|---|---|---|
| 2017/0244142 A1 | 8/2017 | Yao et al. |
| 2017/0250386 A1 | 8/2017 | Pan et al. |
| 2017/0256828 A1 | 9/2017 | Li et al. |
| 2017/0256830 A1 | 9/2017 | Qiu et al. |
| 2017/0256832 A1 | 9/2017 | Li et al. |
| 2017/0256834 A1 | 9/2017 | Li |
| 2017/0335160 A1 | 11/2017 | Yamazaki et al. |
| 2018/0034024 A1 | 2/2018 | Chen et al. |
| 2018/0044191 A1 | 2/2018 | Song et al. |
| 2018/0108888 A1 | 4/2018 | Chen et al. |
| 2018/0151929 A1 | 5/2018 | Song et al. |
| 2018/0208820 A1* | 7/2018 | Tsuda ................. H01L 23/3733 |
| 2018/0265751 A1 | 9/2018 | Babilo et al. |
| 2019/0040183 A1 | 2/2019 | Yoshida et al. |
| 2019/0345332 A1 | 11/2019 | Shimada et al. |
| 2021/0017379 A1 | 1/2021 | Pollum, Jr. et al. |
| 2021/0198538 A1 | 7/2021 | Desai et al. |
| 2022/0153987 A1 | 5/2022 | Tong et al. |
| 2022/0204822 A1 | 6/2022 | Desai et al. |
| 2022/0204823 A1 | 6/2022 | Desai et al. |
| 2022/0213362 A1 | 7/2022 | Desai et al. |
| 2022/0267563 A1 | 8/2022 | Mezzanotti et al. |
| 2023/0019038 A1 | 1/2023 | Ma et al. |
| 2023/0183445 A1 | 6/2023 | Ma et al. |
| 2023/0193106 A1 | 6/2023 | Ma et al. |
| 2023/0212435 A1* | 7/2023 | Ma ................... H01M 10/6554 |
| | | 429/509 |
| 2023/0220219 A1 | 7/2023 | Ma et al. |
| 2023/0250274 A1 | 8/2023 | Pollum, Jr. et al. |
| 2023/0357562 A1 | 11/2023 | Pollum, Jr. et al. |

FOREIGN PATENT DOCUMENTS

| | | |
|---|---|---|
| CN | 105789505 A | 7/2016 |
| CN | 205406676 U | 7/2016 |
| CN | 205723711 U | 11/2016 |
| CN | 205723865 U | 11/2016 |
| CN | 107987533 A | 5/2018 |
| EP | 0932589 B1 | 4/2002 |
| EP | 2402395 A2 | 1/2012 |
| EP | 3266745 A1 | 1/2018 |
| JP | 2008-169265 A2 | 7/2008 |
| JP | 4495772 B1 | 7/2010 |
| JP | 4663153 B2 | 3/2011 |
| JP | 2012-219251 A2 | 11/2012 |
| JP | 2012219251 A | 11/2012 |
| KR | 10-2014-0009408 A | 1/2014 |
| KR | 10-2014-0019357 A | 2/2014 |
| KR | 10-2014-0103106 A | 8/2014 |
| RU | 2205840 C2 | 6/2003 |
| RU | 2499656 C2 | 11/2013 |
| WO | 2014141691 A1 | 9/2014 |
| WO | 2015067569 A1 | 5/2015 |
| WO | 2017145410 A1 | 8/2017 |
| WO | 2017198017 A1 | 11/2017 |
| WO | 2018030079 A1 | 2/2018 |
| WO | 2018095759 A1 | 5/2018 |
| WO | 2018/180470 A1 | 10/2018 |
| WO | WO2020077333 A1 | 4/2020 |
| WO | WO2021211694 A1 | 10/2021 |

* cited by examiner

COMPOSITIONS CONTAINING THERMALLY CONDUCTIVE FILLERS

CROSS-REFERENCE TO RELATED APPLICATIONS

This application claims priority to U.S. Provisional Patent Application No. 62/745,006, entitled "Compositions Containing Thermally Conductive Fillers," filed on Oct. 12, 2018, and U.S. Provisional Patent Application No. 62/894,908, entitled "Compositions Containing Thermally Conductive Fillers," filed on Sep. 2, 2019, each of which are incorporated herein by reference.

FIELD OF THE INVENTION

The present invention relates to compositions containing a thermally conductive filler component, for example sealants, adhesives, putties, and coating compositions.

BACKGROUND OF THE INVENTION

Coating compositions, including sealants and adhesives, are utilized in a wide variety of applications to treat a variety of substrates or to bond together two or more substrate materials.

The present invention is directed toward one-component and two-component compositions that contain thermally conductive fillers.

SUMMARY OF THE INVENTION

The present invention is directed to a composition comprising: an electrophile; a nucleophile; and a thermally conductive filler package comprising thermally conductive, electrically insulative filler particles, the thermally conductive, electrically insulative filler particles having a thermal conductivity of at least 5 W/m·K (measured according to ASTM D7984) and a volume resistivity of at least 10 Ω·m (measured using ASTM D257, C611, or B193), the thermally conductive, electrically insulative filler particles being present in an amount of at least 90% by volume based on total volume of the filler package; wherein the thermally conductive filler package is present in an amount of 10% by volume percent to 98% by volume based on total volume of the composition.

The present invention also is directed to a method for treating a substrate comprising contacting at least a portion of a surface of the substrate with a composition of the present invention.

The present invention also is directed to a substrate comprising a surface at least partially coated with a layer formed from a composition of the present invention.

The present invention also is directed to a thermally conductive part formed from a composition of the present invention.

The present invention also is directed to a battery pack comprising at least two battery cells and a thermally conductive part formed from a composition of the present invention.

The present invention also is directed to a circuit board comprising a thermally conductive part formed from a composition of the present invention.

DETAILED DESCRIPTION OF THE INVENTION

Figure 1:
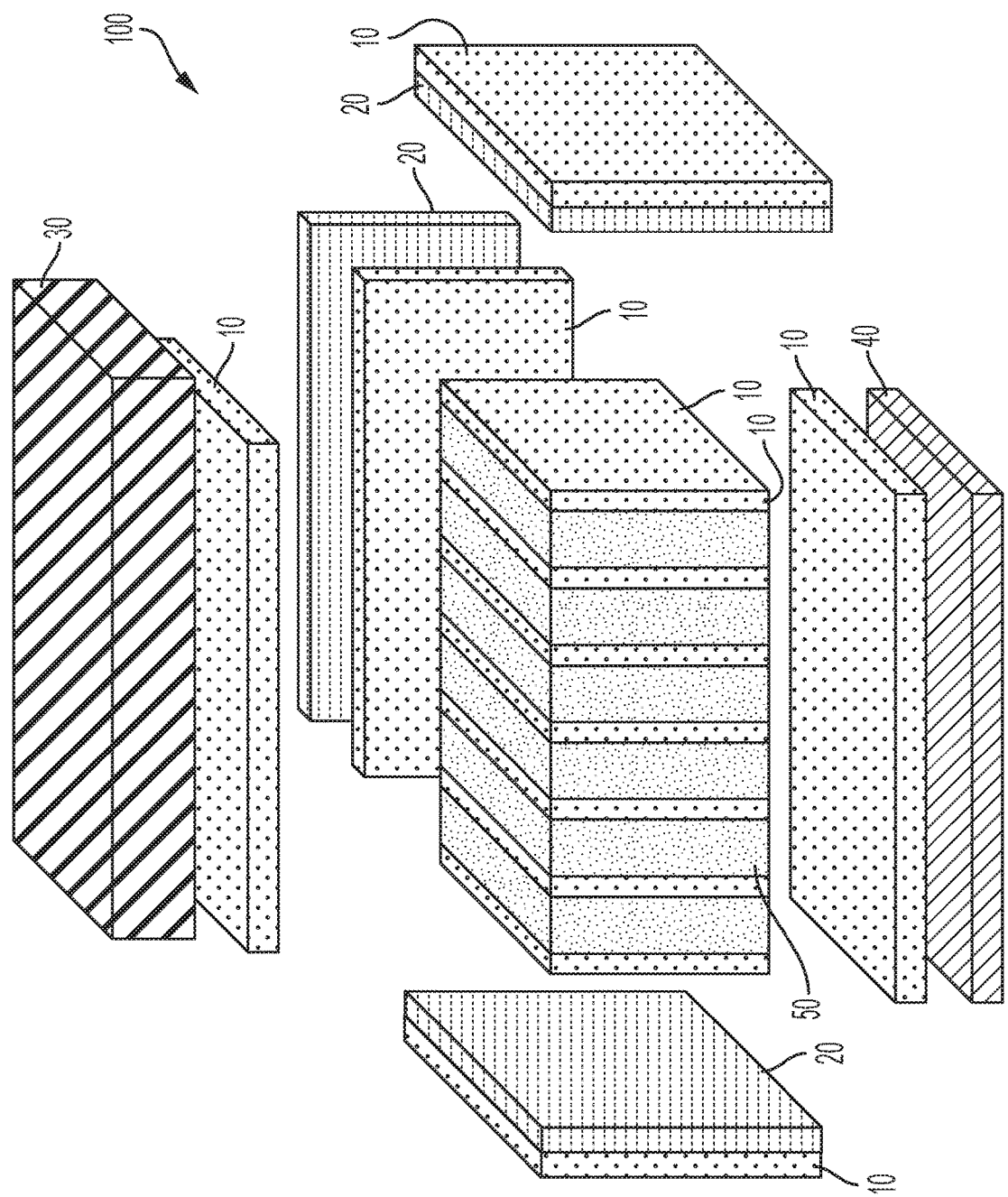
FIG. 1 is a schematic perspective view illustrating a thermally conductive member utilized in a battery pack.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "an" electrophile, "a" nucleophile, "a" catalyst, "a" filler material, a combination (i.e., a plurality) of these components may be used.

In addition, in this application, the use of "or" means "and/or" unless specifically stated otherwise, even though "and/or" may be explicitly used in certain instances.

As used herein, the terms "on," "onto," "applied on," "applied onto," "formed on," "deposited on," "deposited onto," and the like mean formed, overlaid, deposited, or provided on, but not necessarily in contact with, a substrate surface. For example, a composition "applied onto" a substrate surface does not preclude the presence of one or more other intervening coating layers or films of the same or different composition located between the composition and the substrate surface.

As used herein, a "coating composition" refers to a composition, e.g., a solution, mixture, or a dispersion, that, in an at least partially dried or cured state, is capable of producing a film, layer, or the like on at least a portion of a substrate surface.

As used herein, a "sealant composition" refers to a coating composition, e.g., a solution, mixture, or a dispersion, that, in an at least partially dried or cured state, has the ability to resist atmospheric conditions and particulate matter, such as moisture and temperature and at least partially block the transmission of materials, such as particulates, water, fuel, and other liquids and gasses.

As used herein, a "gap filler composition" refers to a coating composition, e.g., a solution, mixture, or a dispersion, that, in an at least partially dried or cured state, fills a gap.

As used herein, an "adhesive composition" refers to a coating composition, e.g., a solution, mixture, or a dispersion, that, in an at least partially dried or cured state, produces a load-bearing joint, such as a load-bearing joint having a lap shear strength of at least 0.05 MPa, as determined according to ASTM D1002-10 using an Instron 5567 machine in tensile mode with a pull rate of 1 mm per minute and/or a butt joint strength of at least 0.001 N/mm$^2$ (measured according to ASTM D2095).

As used herein, the term "one component" or "1K" refers to a composition in which all of the ingredients may be premixed and stored and wherein the reactive components do not readily react at ambient or slightly thermal conditions and remain "workable" for at least 10 days after mixing, but instead react only upon activation by an external energy source, under pressure, and/or under high shear force. External energy sources that may be used to promote curing include, for example, radiation (i.e., actinic radiation such as ultraviolet light) and/or heat. As used herein, the term "workable" means that the composition is of a viscosity that it is able to be deformed and/or shaped under manual pressure and may have a viscosity less than such viscosity.

As further defined herein, ambient conditions generally refer to room temperature and humidity conditions or temperature and humidity conditions that are typically found in the area in which the composition is applied to a substrate, e.g., at 20° C. to 40° C. and 20% to 80% relative humidity, while slightly thermal conditions are temperatures that are slightly above ambient temperature but are generally below the curing temperature for the composition (i.e., in other words, at temperatures and humidity conditions below which the reactive components will readily react and cure, e.g., >40° C. and less than 220° C. at 20% to 80% relative humidity).

As used herein, the term "two-component" or "2K" refers to a composition in which at least a portion of the reactive components readily associate to form an interaction or react to form a bond (physically or chemically), and at least partially cure without activation from an external energy source, such as at ambient or slightly thermal conditions, when mixed. One of skill in the art understands that the two components of the composition are stored separately from each other and mixed just prior to application of the composition. Two-component compositions may optionally be heated or baked, as described below.

As used herein, the term "cure" or "curing", means that the components that form the composition are crosslinked to form a film, layer, or bond. As used herein, the term "at least partially cured" means that at least a portion of the components that form the composition interact, react, and/or are crosslinked to form a film, layer, or bond. In the case of a 1K composition, the composition is at least partially cured or cured when the composition is subjected to curing conditions that lead to the reaction of the reactive functional groups of the components of the composition. In the case of a 2K composition, the composition is at least partially cured or cured when the components of the composition are mixed to lead to the reaction of the reactive functional groups of the components of the composition.

As used herein, the "epoxy equivalent weight" is determined by dividing the theoretical molecular weight of the epoxy compound by the number of epoxide groups present in the epoxy compound. In the case of oligomeric or polymeric epoxy compounds, the epoxy equivalent weight is determined by dividing the average molecular weight of the epoxy compound by the average number of epoxide groups present in the molecules.

As used herein, the "polythiol equivalent weight" is determined by dividing the theoretical molecular weight of the polythiol by the number of thiol groups present in the polythiol. In the case of oligomeric or polymeric thiol compounds, the thiol equivalent weight is determined by dividing the average molecular weight of the thiol compound by the average number of thiol groups present in the molecules.

As used herein, the term "electrophile" means an atom or a molecule that has an empty orbital, including an anti-bonding σ or anti-bonding π orbital.

As used herein, the term "nucleophile" means an atom or a molecule that has a pair of electrons or at least one π bond that can donate to an empty orbital of an electrophile, such as a lone pair, a σ bond, or a π bond.

As used herein, the term "monofunctional" means an atom or molecule that is only capable of reacting to form one new bond.

As used herein, the term "polyfunctional" means an atom or a molecule that is capable of reacting to form more than one new bond more than one time through the same atom and/or through multiple single reactions of atoms within the molecule. For clarity, polyfunctional includes difunctional.

As used herein, the term "monofunctional electrophile" means an atom or a molecule that has an empty orbital, including an anti-bonding σ or anti-bonding π orbital and that is capable of reacting to form one new bond.

As used herein, the term "polyfunctional electrophile" means an atom or a molecule that has an empty orbital, including an anti-bonding σ or anti-bonding π orbital and that is capable of reacting more than one time through the same atom and/or through multiple single reactions of atoms within the molecule.

As used herein, the term "monofunctional nucleophile" means an atom or a molecule that has a pair of electrons or at least one π bond that can donate to an empty orbital of an electrophile, such as a lone pair, a σ bond, or a π bond and that is capable of reacting to form one new bond.

As used herein, the term "polyfunctional nucleophile" means an atom or a molecule that has a pair of electrons or at least one π bond that can donate to an empty orbital of an electrophile, such as a lone pair, a σ bond, or a π bond and that is capable of reacting more than one time through the same atom and/or through multiple single reactions of atoms within the molecule.

As used herein, the term "thermally conductive filler" or "TC" filler means a pigment, filler, or inorganic powder that has a thermal conductivity of at least 5 W/m·K at 25° C. (measured according to ASTM D7984).

As used herein, the term "non-thermally conductive filler" or "NTC filler" means a pigment, filler, or inorganic powder that has a thermal conductivity of less than 5 W/m·K at 25° C. (measured according to ASTM D7984).

As used herein, the term "electrically insulative filler" or "EI filler" means a pigment, filler, or inorganic powder that has a volume resistivity of at least 10 Ω·m (measured according to ASTM D257, C611, or B193).

As used herein, the term "electrically conductive filler" or "EC filler" means a pigment, filler, or inorganic powder that has a volume resistivity of less than 10 Ω·m (measured according to ASTM D257, C611, or B193).

As used herein, the term "catalyst" means a substance that increases the rate or decreases the activation energy of a chemical reaction. A catalyst may be either unreactive, that is, without itself undergoing any permanent chemical change, or may be reactive, that is, capable of chemical reactions and includes any level of reaction from partial to complete reaction of a reactant.

As used herein, the term "active catalyst" means a molecule or a compound that does not require activation by an external energy source to have a catalytic effect, e.g., the catalyst is not "blocked" or "encapsulated."

As used herein, the term "latent catalyst" or "blocked catalyst" or "encapsulated catalyst" means a molecule or a compound that is activated by an external energy source prior to having a catalytic effect. For example, the latent catalyst may be in the form of a solid at room temperature and have no catalytic effect until it is heated and melts, or the latent catalyst may be reversibly reacted with a second compound that prevents any catalytic effect until the reversible reaction is reversed by the application of heat and the second compound is removed, freeing the catalyst to catalyze reactions.

As used herein, the term "accelerator" refers to a substance that accelerates a catalyst but that is not itself a catalyst.

As used herein, the term "solvent" refers to a molecule or a compound that has a high vapor pressure such as greater than 2 mm Hg at 25° C. determined by differential scanning calorimetry according to ASTIM E1782 and is used to lower the viscosity of a resin but that does not have a reactive functional group capable of reacting with a functional group(s) on molecules or compounds in a composition.

As used herein, the term "reactive diluent" refers to a molecule or a compound that has a low vapor pressure such as 2 mm Hg or less at 25° C. determined by differential scanning calorimetry according to ASTIM E1782 and is used to lower the viscosity of a resin but that has at least one functional group capable of reacting with a functional group(s) on molecules or compounds in a composition.

As used herein, the term "plasticizer" refers to a molecule or a compound that does not have a functional group capable of reacting with a functional group(s) on molecules or compounds in a composition and that is added to the composition to decrease viscosity, decrease glass transition temperature (Tg), and impart flexibility.

As used herein, the volume percentage of each ingredient is calculated using below equation:

$$vol\ \%\ (\text{ingredient}) = \frac{\text{volume of ingredient}}{\text{volume of total composition}} \times 100\%$$

wherein the volume of the ingredient is calculated by $$\frac{\text{Weight of ingredient}}{\text{True Density of ingredient}}.$$

The present invention is directed to a composition comprising, or consisting essentially of, or consisting of, an electrophile, a nucleophile, and a first thermally conductive (TC) filler having a thermal conductivity of at least 5 W/m·K (measured according to ASTM D7984), wherein the composition has a viscosity of 10 cP to $10^8$ cP at a shear stress of 800 Pa as measured by an Anton Paar MCR 301 rotational rheometer at 25° C. using a parallel plate with a diameter of 25 mm (1 mm gap).

Disclosed herein is a composition comprising, or consisting essentially of, or consisting of, a composition, comprising: an electrophile; a nucleophile; and a thermally conductive filler package comprising thermally conductive (TC) and electrically insulative (EI) filler particles, the TC/EI filler particles having a thermal conductivity of at least 5 W/m·K measured according to ASTM D7984 and a volume resistivity of at least 10 Ω·m (measured according to ASTM D257, C611, or B193), the TC/EI filler particles being present in an amount of at least 70 volume percent based on total volume of the filler package; wherein the thermally conductive filler package is present in an amount of 10 volume percent to 99 volume percent based on total volume of the composition. As discussed in more detail below, the composition may have a viscosity of 10 cP to $10^8$ cP at a shear stress of 800 Pa as measured by an Anton Paar MCR 301 rotational rheometer at 25° C. using a parallel plate with a diameter of 25 mm (1 mm gap). The composition may be a coating composition, such as a sealant composition, an adhesive composition, a gap filling composition, a putty, a 3D-printable composition or may be used in its at least partially dried or cured state to form a film, layer, or the like, or a part, such as a casted, molded, extruded, or machined part.

As stated above, the composition comprises an electrophile comprising functional group(s) capable of reacting with the functional group(s) of the nucleophile, such as electrophilic moieties such as epoxide functional groups, carbonate functional groups, and/or isocyanate functional groups. Suitable electrophiles that may be used in the compositions of the present invention may comprise epoxy-containing compounds, carbonate-containing compounds, isocyanate-containing compounds, or combinations thereof. The electrophile may be monofunctional or polyfunctional.

Suitable epoxy-containing compounds that may be used in the compositions disclosed herein may comprise monoepoxides, diepoxides, and/or polyepoxides.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, Epodil 741 available from Evonik, Epodil 746 available from Evonik, ERISYS® GE-7 available from CVC Thermoset Specialties, and mixtures of any of the foregoing.

Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other suitable polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides that are derived from the epoxidation of an olefinically unsaturated nonaromatic cyclic compound, polyepoxides containing oxyalkylene groups in the epoxy molecule, and epoxy novolac resins. Still other suitable epoxy-containing compounds include epoxidized Bisphenol A novolacs, epoxidized phenolic novolacs, epoxidized cresylic novolac, and triglycidyl p-aminophenol bismaleimide. The epoxy-containing compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid). The epoxy-containing compound may also comprise a carboxyl-terminated butadiene-acrylonitrile copolymer modified epoxy-containing compound. The epoxy-containing compound may also comprise epoxidized castor oil. The epoxy-containing compound may also comprise an epoxy-containing acrylic, such as glycidyl methacrylate. The epoxy-containing compound may also comprise an epoxy-containing polymer such as epoxy-containing polyacrylate.

The epoxy-containing compound may comprise an epoxy-adduct. The composition may comprise one or more epoxy-adducts. As used herein, the term "epoxy-adduct" refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

The epoxy compound used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromellitic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

The diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

The epoxy-adduct may comprise a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

The epoxy-adduct may comprise a triol, a monoanhydride or a diacid, and a diepoxy compound, wherein the mole ratio of triol, monoanhydride (or diacid), and diepoxy compounds in the epoxy-adduct may vary from 0.5:0.8:1.0 to 0.5:1.0:6.0.

The epoxy-adduct may comprise a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

The epoxy compound may have an epoxy equivalent weight of at least 90 g/eq, such as at least 140 g/eq, such as at least 188 g/eq, and may have an epoxy equivalent weight of no more than 2,000 g/eq, such as no more than 1,000 g/eq, such as no more than 500 g/eq. The epoxy compound may have an epoxy equivalent weight of 90 g/eq to 2,000 g/eq, such as 140 g/eq to 1,000 g/eq, such as 188 g/eq to 500 g/eq.

The epoxy compound may have at least one functional group that is different from the epoxide functional group(s).

In another example, the epoxy-containing compound of the composition may further include elastomeric particles. As used herein, "elastomeric particles" refers to particles having a glass transition temperature (Tg) of −70° C. to 0° C. as measured by Differential Scanning Calorimetry (DSC) or Dynamic Mechanical Analysis (DMA). The elastomeric particles may be included in an epoxy carrier resin for introduction into the coating composition. The elastomeric particles may be phase-separated from the epoxy in the epoxy-containing compound. As used herein, the term "phase-separated" means forming a discrete domain within a matrix of the epoxy-containing compound.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, hydronated styrene-butadiene, or combinations thereof. The type of elastomeric particles and the concentration thereof is not limited as long as the particle size falls within the specified range as illustrated below.

The average particle size of the elastomeric particles may be, for example, 0.02 microns to 5 microns (20 nm to 5,000 nm), such as 20 nm to 500 nm, such as 50 nm to 250 nm, the reported particle sizes for rubber particles provided by Kanekea Texas Corporation, as measured by standard techniques known in the industry. Suitable methods of measuring particles sizes disclosed herein include, for example, according to ISO 13320 and ISO 22412 or as measured by transmission electron microscopy (TEM). Suitable methods of measuring particle sizes by TEM include suspending elastomeric particles in a solvent selected such that the particles do not swell, and then drop-casting the suspension onto a TEM grid which is allowed to dry under ambient conditions. For example, epoxy resin containing core-shell elastomeric particles may be diluted in butyl acetate for drop casting and measurements may be obtained from images acquired from a Tecnai T20 TEM operating at 200 kV and analyzed using ImageJ software, or an equivalent solvent, instrument and software.

In an example, suitable finely dispersed core-shell elastomeric particles having an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 5% to 40% rubber particles by weight based on the total weight of the rubber dispersion, such as from 20% to 35%. Suitable epoxy resins may also include a mixture of epoxy resins. When utilized, the epoxy carrier resin may be an epoxy-containing component of the present invention such that the weight of the epoxy-containing component present in the composition includes the weight of the epoxy carrier resin.

Exemplary non-limiting commercial core-shell elastomeric particle products using poly(butadiene) rubber particles that may be utilized in the composition include core-shell poly(butadiene) rubber powder (commercially available as PARALOID™ EXL 2650 from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), and core-shell poly(butadiene) rubber dispersion (40% rubber by weight) in bisphenol A diglycidyl ether (commercially available as Kane Ace MX 150), each available from Kaneka Texas Corporation, and acrylic rubber dispersions.

Exemplary non-limiting commercial core-shell elastomeric particle products using styrene-butadiene rubber particles that may be utilized in the composition include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation. Other commercially available core-shell rubber particle dispersions include Fortegra 352 (33% core-shell rubber particles by weight in bisphenol A liquid epoxy resin), available from Olin Corporation. Other commercially available core-shell rubber particle dispersions include Paraloid™ EXL 2650A (core-shell poly(butadiene) commercially available from Dow.

Exemplary non-limiting commercial core-shell elastomeric particle products using polysiloxane rubber particles that may be utilized in the composition include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonick), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The elastomeric particles may be present in the composition in an amount of at least 2 percent by weight based on the total weight of the composition, such as at least 3 percent by weight, such as at least 10 percent by weight, and may be present in an amount of no more than 40 percent by weight based on total weight of the composition, such as no more than 35 percent by weight, such as no more than 24 percent by weight. The elastomeric particles may be present in the composition in an amount of 2 percent by weight to 40 percent by weight based on total weight of the composition, such as 3 percent by weight to 35 percent by weight, such as 10 percent by weight to 24 percent by weight.

As discussed above, the electrophile also may comprise an isocyanate. The isocyanate of the present invention can be monomeric or polymeric containing one or more isocyanate functional groups (—N=C=O).

Suitable monomeric isocyanate-containing compounds include p-tolyl isocyanate, hexyl isocyanate, phenyl isocyanate, isocyanate ethyl arylate, methacryloyloxyethyl isocyanate, 3-(triethyoxysilyl)propyl isocyante.

Suitable isocyanate-containing compounds that may be used in the compositions described herein may comprise a polyisocyanate. For example, the polyisocyanate may comprise $C_2$-$C_{20}$ linear, branched, cyclic, aliphatic and/or aromatic polyisocyanates.

Aliphatic polyisocyanates may include (i) alkylene isocyanates, such as: trimethylene diisocyanate; tetramethylene diisocyanate, such as 1,4-tetramethylene diisocyanate; pentamethylene diisocyanate, such as 1,5-pentamethylene diisocyanate and 2-methyl-1,5-pentanethylene diisocyanate; hexamethylene diisocyanate ("HDI"), commercially available as Demodur XP 2617 (Covestro), such as 1,6-hexamethylene diisocyanate and 2,2,4- and 2,4,4-trimethylhexamethylene diisocyanate, or mixtures thereof; heptamethylene diisocyanate, such as 1,7-heptamethylene diisocyanate; propylene diisocyanate, such as 1,2-propylene diisocyanate; butylene diisocyanate, such as 1,2-butylene diisocyanate, 2,3-butylene diisocyanate, 1,3-butylene diisocyanate, and 1,4-butylene diisocyanate; ethylene diisocyanate; decamethylene diisocyanate, such as 1,10-decamethylene diisocyanate; ethylidene diisocyanate; and butylidene diisocyanate. Aliphatic polyisocyanates may also include (ii) cycloalkylene isocyanates, such as: cyclopentane diisocyanate, such as 1,3-cyclopentane diisocyanate; cyclohexane diisocyanate, such as 1,4-cyclohexane diisocyanate, 1,2-cyclohexane diisocyanate, isophorone diisocyanate ("IPDI"), methylene bis(4-cyclohexylisocyanate) ("HMDI"); and mixed aralkyl diisocyanates such as tetramethylxylyl diisocyanates, such as meta-tetramethylxylylene diisocyanate (commercially available as TMXDI® from Allnex SA). Dimers, trimers, oligomers, and polymers of the abovementioned polyisocyanates also may be used as the cyclotrimer of 1,6 hexamethylene diisocyanate (also known as the isocyanate trimer of HDI, commercially available as Desmoder N3300 (Covestro)).

Aromatic polyisocyanates may include (i) arylene isocyanates, such as: phenylene diisocyanate, such as m-phenylene diisocyanate, p-phenylene diisocyanate, and chlorophenylene 2,4-diisocyanate; naphthalene diisocyanate, such as 1,5-naphthalene diisocyanate and 1,4-naphthalene diisocyanate. Aromatic polyisocyanates may also include (ii) alkarylene isocyanates, such as: methylene-interrupted aromatic diisocyanates, such as 4,4'-diphenylene methane diisocyanate ("MDI"), and alkylated analogs such as 3,3'-dimethyl-4,4'-diphenylmethane diisocyanate, and polymeric methylenediphenyl diisocyanate; toluene diisocyante ("TDI"), such as 2,4-tolylene or 2,6-tolylene diisocyanate, or mixtures thereof, bitoluene diisocyanate; and 4,4-toluidine diisocyanate; xylene diisocyanate; dianisidine diisocyanate; xylylene diisocyanate; and other alkylated benzene diisocyanates.

Polyisocyanates may also include: triisocyanates, such as triphenyl methane-4,4', 4''-triisocyanate, 1,3,5-triisocyanato benzene, and 2,4,6-triisocyanato toluene; tetraisocyanates, such as 4,4'-diphenyldimethyl methane-2,2', 5,5'-tetraisocyanate; and polymerized polyisocyanates, such as tolylene diisocyanate dimers and trimers and the like.

The isocyanate compound may have at least one functional group that is different from the isocyanate functional group(s).

As discussed above, the electrophile also may comprise a carbonate-containing compound. The carbonate-containing compound may be polymeric containing one or more carbonate functional groups

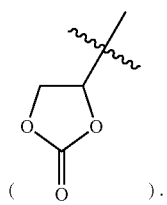

Suitable monofunctional carbonate-containing compounds that may be used in the compositions described herein may comprise propylene carbonate, glycerol carbonate, glycerol carbonate methacrylate, allyl glycerol carbonate, propyl carbonate triethoxysilane, phenoxycarbonyloxymethyl ethylene carbonate, or combinations thereof.

The electrophile may be present in the composition in an amount of at least 1% by volume based on total volume of the composition, such as at least 3% by volume, such as at least 5% by volume, and may be present in the composition in an amount of no more than 89% by volume based on total volume of the composition, such as no more than 85% by volume, such as no more than 80% by volume. The electrophile may be present in the composition in an amount of 1% by volume to 89% by volume based on total volume of the composition, such as 3% by volume to 85% by volume, such as 5% by volume to 80% by volume.

The composition of the present invention also comprises a nucleophile comprising functional group(s) capable of reacting with the functional group(s) electrophile, such as nucleophilic moieties such as active hydrogen functional groups including amine functional groups, hydroxy functional groups, thiol functional groups, carboxy functional groups, anhydride functional groups, and combinations thereof. Suitable nucleophiles that may be used in the compositions of the present invention may comprise an amine, a thiol, a polyol, a carboxylic acid, an anhydride, or combinations thereof. The nucleophile may be blocked or unblocked or encapsulated or unencapsulated. The nucleophile may be monofunctional, difunctional, and/or polyfunctional.

Suitable amines for use in the compositions disclosed herein can be selected from a wide variety of known amines such as primary and secondary amines, and mixtures thereof. The amine may include monoamines, or polyamines having at least two functional groups such as di-, tri-, or higher functional amines; and mixtures thereof. The amine may be aromatic or aliphatic such as cycloaliphatic, or mixtures thereof. Non-limiting examples of suitable amines may include aliphatic polyamines such as but not limited to ethylamine, isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'- and/or 4,4'-diaminodicyclohexyl methane and 3,3'-dialkyl-4,4'-diaminodicyclohexyl methanes (such as 3,3'-dimethyl-4,4'-diaminodicyclohexyl methane and 3,3'-diethyl-4,4'-diaminodicyclohexyl methane), 2,4'- and/or 2,6-diaminotoluene and 2,4'- and/or 4,4'-diaminodiphenyl methane, piperazines or adducts or derivatives thereof, or mixtures thereof.

Non-limiting examples of secondary amines can include mono- and poly-acrylate and methacrylate modified amines; polyaspartic esters which can include derivatives of compounds such as maleic acid, fumaric acid esters, aliphatic polyamines and the like; and mixtures thereof. The secondary amine may include an aliphatic amine, such as a cycloaliphatic diamine. Such amines are available commercially from Huntsman Corporation (Houston, Tex.) under the designation of JEFFLINK such as JEFFLINK 754 from BASF as Baxxoder PC136.

The amine can include an amine-functional resin. Suitable amine-functional resins can be selected from a wide variety known in the art and can include those having relatively low viscosity. The amine-functional resin may be an ester of an organic acid, for example, an aspartic ester-based amine-functional reactive resin that is compatible with isocyanate. The isocyanate may be solvent-free, and/or has a mole ratio of amine-functionality to the ester of no more than 1:1 so that no excess primary amine remains upon reaction. A non-limiting example of such polyaspartic esters may include the derivative of diethyl maleate and 1,5-diamino-2-methylpentane, which is available commercially from Covestro under the trade name DESMOPHEN NH1220 and the derivative of diethyl maleate and 4,4'-methylenebis(cyclohaxan-1-amine), commercially available as Desmophen NH1420 (Covestro). Other suitable compounds containing aspartate groups may be employed as well.

The amine may include high molecular weight primary amine, such as but not limited to polyoxyalkyleneamine. Suitable polyoxyalkyleneamines may contain two or more primary amino groups attached to a backbone derived, for example, from propylene oxide, ethylene oxide, or mixtures thereof. Non-limiting examples of such amines may include those available under the designation JEFFAMINE from Huntsman Corporation. Such amines may have a molecular weight ranging from 200 to 7500, such as but not limited to JEFFAMINE D-230, D-400, D-2000, T-403, T-5000, XJS-616, and ED600. Other suitable amines include aliphatic and cycloaliphatic polyamines such as the Ancamine® series available from Evonik.

The nucleophile may comprise a monothiol or a polythiol compound. As used herein, a "monothiol compound" refers to a chemical compound having one thiol functional group (—SH) and a "polythiol compound" refers to a chemical compound having at least two thiol functional groups (—SH) that may be used to "cure" a composition of the present invention by reacting with the electrophile to form a polymeric matrix.

The monothiol compound may include t-dodecane thiol, n-dodecyl mercaptan, p-toluenethiol, quinoline thiol, 1-thioglycerol, mercaptosuccinic acid, thiosalicylic acid, 2-aminoethanethiol, 2-thiocytosine, or combinations thereof.

The polythiol compound comprises a compound comprising at least two thiol functional groups. The polythiol compound may comprise a dithiol, trithiol, tetrathiol, pentathiol, hexathiol or higher functional polythiol compound. The polythiol compound may comprise a dithiol compound such as 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG). The polythiol compound may comprise a trithiol compound such as trimethylolpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy)ethyl]isocyanurate (commercially available as THIOCURE® TEMPIC from BRUNO BOCK Chemische Fabrik GmbH & Co. KG). The polythiol compound may comprise a tetrathiol compound such as pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol compounds may include dipentaerythritol hexa-3-mercaptopropionate (commercially available as THIOCURE® DiPETMP from BRUNO BOCK Chemische Fabrik GmbH & Co. KG). Combinations of polythiol compounds may also be used.

The polythiol compound may comprise a mercaptan terminated polysulfide. Commercially available mercaptan terminated polysulfides include those sold under the trade name THIOKOL® LP from Toray Fine Chemicals Co., Ltd., including, but not limited to, LP-3, LP-33, LP-23, LP-980, LP-2, LP-32, LP-12, LP-31, LP-55 and LP-56. The THIOKOL LP mercaptan terminated polysulfides have the general structure HS—$(C_2H_4$—O—$CH_2$—O—$C_2H_4$—S—S$)_n C_2 H_4$O—$CH_2$—O—$C_2H_4$—SH, wherein n is an integer of 5 to 50. Other commercially available mercaptan terminated polysulfides include those sold under the trade name THIOPLAST® G™ from Akzo Nobel Chemicals International B.V., including, but not limited to, G 10, G 112, G 131, G 1, G 12, G 21, G 22, G 44 and G 4. The THIOPLAST G mercaptan terminated polysulfides are blends of di- and tri-functional mercaptan-functional polysulfides with the difunctional unit having the structure HS—(R—S—S$)_n$—R—SH, wherein n is an integer from 7 to 38, and the tri-functional unit having the structure HS—(R—S—S$)_a$—$CH_2$—CH((S—S—R$)_c$—SH)—$CH_2$—(S—S—R$)_b$—SH, wherein a+b+c=n and n is an integer from 7 to 38.

The polythiol compound may comprise a mercaptan terminated polyether. Commercially available mercaptan terminated polyether include POLYTHIOL QE-340M available from Toray Fine Chemicals Co., Ltd.

The polythiol compound may have a thiol equivalent weight of at least 80 g/eq, such as at least 100 g/eq, such as at least 125 g/eq, such as at least 400 g/eq, and may have a thiol equivalent weight of no more than 4,000 g/eq, such as no more than 2,500 g/eq, such as no more than 2,000 g/eq, such as no more than 1,650 g/eq. The polythiol compound may have a thiol equivalent weight of 80 g/eq to 4,000 g/eq, such as 100 g/eq to 2,500 g/eq, such as 125 g/eq to 2,000 g/eq, such as 400 g/eq to 1,650 g/eq.

Suitable polyethers useful in the present invention include those polythioethers having a structure according to Formula I —R$^1$—[—S—$(CH_2)_2$—O—[—R$^2$—O—]$_m$—$(CH_2)_2$—S—R$^1$—]$_n$—   (Formula I)

wherein

R$^1$ denotes a $C_{2-6}$ n-alkylene, $C_{3-6}$ branched alkylene, $C_{6-8}$cycloalkylene or $C_{6-10}$alkylcycloalkylene group, —[(—$CH_2$—)$_p$—X—]$_q$—(—$CH_2$—)$_r$—, or —[(—$CH_2$—)$_p$—X—]$_q$—(—$CH_2$—)$_r$— in which at least one —$CH_2$— unit is substituted with a methyl group, R$^2$ denotes a $C_{2-6}$ n-alkylene, $C_{2-6}$ branched alkylene, $C_{6-8}$ cycloalkylene or $C_{6-10}$alkylcycloalkylene group, or
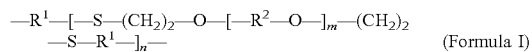

X denotes one selected from the group consisting of O, S and —NR$^6$—,

R$^6$ denotes H or methyl, m is a rational number from 0 to 10, n is an integer from 1 to 60, p is an integer from 2 to 6, q is an integer from 1 to 5, and r is an integer from 2 to 10.

Polythioether polymers useful in the compositions disclosed herein may have a glass transition temperature T$_g$ that is not higher than −50° C., such as not higher than −55° C., such as not higher than −60° C. Low T$_g$ is indicative of good low temperature flexibility, which can be determined by known methods, for example, by the methods described in AMS (Aerospace Material Specification) 3267 § 4.5.4.7, MIL-S (Military Specification)-8802E § 3.3.12 and MIL-S-29574, and by methods similar to those described in ASTM (American Society for Testing and Materials) D522-88 and AMS 3277.

Polythioethers useful in the compositions disclosed herein may have number average molecular weights of at least 500, such as at least 1,000, such as at least 2,000 and may have number average molecular weights of no more than 20,000, such as no more than 10,000, such as no more than 5,000. Polythioethers useful in the compositions disclosed herein may have number average molecular weights of 500 to 20,000, such as 1,000 to 10,000, such as 2,000 to 5,000 measured by gel permeation chromatography (GPC) using polystyrene standards and waters Styragel column in THF solvent.

Polythioether polymers useful in the compositions disclosed herein can be difunctional, that is, linear polymers having two end groups, or polyfunctional, that is, branched polymers having three or more end groups. Depending on the relative amounts of dithiol(s) and divinyl ether(s) used to prepare the polymers, the polymers can have terminal thiol groups (SH) or terminal vinyl groups (—CH=CH$_2$). Furthermore, the polymers can be uncapped, that is, include thiol or vinyl terminal groups that are not further reacted, or capped, that is, include thiol or vinyl groups that are further reacted with other compounds. Capping the polythioethers enables introduction of additional terminal functionalities, for example, hydroxyl or amine groups, to the inventive polymers, or in the alternative, introduction of end groups that resist further reaction, such as terminal alkyl groups.

For example, the polythioether may have the Formula II

A-(—[R$^3$]$_y$—R$^4$)$_2$   (Formula II)

wherein

A denotes a structure having the formula I, y is 0 or 1,

R$^3$ denotes a single bond when y=0 and —S—(CH$_2$)$_2$—[—O—R$^2$—]$_m$—O— when y=1, R$^4$ denotes —SH or —S—(—CH$_2$—)$_{2+s}$—O—R$^5$ when y=0 and —CH$_2$=CH$_2$ or —(CH$_2$—)$_2$—S—R$^5$ when y=1, s is an integer from 0 to 10, R$^5$ denotes C$_{1-6}$ n-alkyl which is unsubstituted or substituted with at least one —OH or —NHR$^7$ group, and R$^7$ denotes H or a C$_{1-6}$ n-alkyl group.

Thus, polythioethers of the formula II are linear, difunctional polymers which can be uncapped or capped. When y=0, the polymer includes terminal thiol groups or capped derivatives thereof. When y=1, the polymer includes terminal vinyl groups or capped derivatives thereof.

For example, the polythioether may be a difunctional thiol-terminated (uncapped) polythioether. That is, in formula II, y=0 and R$^4$ is —SH. Thus, the polythioether has the following structure:

HS—R$^1$—[—S—(CH$_2$)$_2$—O—[—R$^2$—O—]$_m$—(CH$_2$)$_2$—S—R$^1$—]$_n$—SH.

The foregoing polymers are produced, for example, by reacting a divinyl ether or mixture thereof with an excess of a dithiol or mixture thereof, as discussed in detail below.

In another example of the foregoing polythioether, when m=1 and R$^2$=n-butylene in formula II, R$^1$ is not ethylene or n-propylene. For example, when m=1, p=2, q=2, r=2 and R$^2$=ethylene, X is not O.

In another example, the polythioether may be a capped polymer in which the foregoing terminal SH groups are replaced by —S—(—CH$_2$—)$_{2+s}$—O—R$^5$. Such caps are produced by reaction of the terminal thiol group with an alkyl o-alkenyl ether, such as a monovinyl ether, for example by including in the reaction mixture a capping agent or mixture thereof, as discussed in detail below.

In the foregoing, R$^5$ denotes an unsubstituted or substituted alkyl group, such as a C$_{1-6}$ n-alkyl group which is unsubstituted or substituted with at least one —OH or —NHR$^7$ group, with R$^7$ denoting H or C$_{1-6}$ n-alkyl. Exemplary useful R$^5$ groups include alkyl groups, such as ethyl, propyl and butyl; hydroxyl-substituted groups such as 4-hydroxybutyl; amine-substituted groups such as 3-aminopropyl; etc.

Polythioethers also include difunctional vinyl-terminated (uncapped) polythioethers. That is, in formula II, y=1 and R$^4$ is CH=CH$_2$. These polymers are produced, for example, by reacting a dithiol or mixture thereof with an excess of a divinyl ether or mixture thereof, as discussed in detail below. Analogous capped polythioethers include terminal —(CH$_2$—)$_2$—S—R$^5$.

The foregoing polythioethers are linear polymers having a functionality of 2 (considering alkyl and other non-reactive caps within this total). Polythioethers having higher functionality are also within the scope of the present invention. Such polymers are prepared, as discussed in detail below, by using a polyfunctionalizing agent. The term "polyfunctionalizing agent" as employed herein denotes a compound having more than two moieties that are reactive with terminal —SH and/or —CH=CH$_2$ groups. The polyfunctionalizing agent may include from 3 to 6 such moieties, and thus is denoted a "z-valent" polyfunctionalizing agent, where z is the number (such as from 3 to 6) of such moieties included in the agent, and hence the number of separate branches which the polyfunctional polythioether comprises. The polyfunctionalizing agent can be represented by the formula B—(R$^8$)$_z$ where R$^8$ denotes a moiety that is reactive with terminal —SH or —CH=CH$_2$ and can be the same or different, and B is the z-valent residue of the polyfunctionalizing agent, i.e., the portion of the agent other than the reactive moieties R$^7$.

Polyfunctional polythioethers according to the present invention thus may have the Formula III B-(A-[R$^3$]$_y$—R$^4$)$_z$   Formula III wherein A denotes a structure having the Formula I, y is 0 or 1, R$^3$ denotes a single bond when y=0 and —S—(CH$_2$)$_2$—[—O—R$^2$-]$_m$—O— when y=1, R⁴ denotes —SH or —S—(—CH$_2$—)$_{2+s}$—O—R⁵ when y=0 and —CH$_2$=CH$_2$ or —(CH$_2$—)$_2$—S—R⁵ when y=1, R⁵ denotes C$_{1-6}$ n-alkyl which is unsubstituted or substituted with at least one —OH or —NHR⁷ group, R⁷ denotes H or a C$_{1-6}$ n-alkyl group, z is an integer from 3 to 6, and B denotes a z-valent residue of a polyfunctionalizing agent.

As with the preceding difunctional polythioethers, the foregoing polyfunctional polythioethers of the present invention can include terminal —SH or —CH=CH$_2$ groups, or can be capped and thus include terminal —S—(—CH$_2$—)$_{2+s}$—O—R⁵ or —(CH$_2$—)$_2$—S—R⁵ groups. Partially capped polyfunctional polymers, i.e., polymers in which some but not all of the branches are capped, are also within the scope of the present invention.

Specific polyfunctionalizing agents include trifunctionalizing agents, that is, compounds with z=3. Suitable trifunctionalizing agents include triallylcyanurate (TAC), which is reactive with compounds of the formula II (R⁸=allyl), and 1,2,3-propanetrithiol, which is reactive with compounds of the formula III (R⁸=—SH). Agents having mixed functionality, i.e., agents that include moieties (typically separate moieties) that react with both thiol and vinyl groups, can also be employed.

Other useful polyfunctionalizing agents include trimethylolpropane trivinyl ether, and the polythiols described in U.S. Pat. Nos. 4,366,307, 4,609,762 and 5,225,472, the disclosures of each of which are incorporated in their entireties herein by reference. Mixtures of polyfunctionalizing agents can also be used.

Polyfunctionalizing agents having more than three reactive moieties (i.e., z>3) afford "star" polythioethers and hyperbranched polythioethers. For example, two moles of TAC can be reacted with one mole of a dithiol to afford a material having an average functionality of 4. This material can then be reacted with a divinyl ether and a dithiol to yield a polymer, which can in turn be mixed with a trifunctionalizing agent to afford a polymer blend having an average functionality between 3 and 4.

Polythioethers as described above have a wide range of average functionality. For example, trifunctionalizing agents afford average functionalities from 2.05 to 3.0, such as 2.1 to 2.6. Wider ranges of average functionality can be achieved by using tetrafunctional or higher polyfunctionalizing agents. Functionality will also be affected by factors such as stoichiometry, as is known to those skilled in the art.

Methods of making the foregoing polyfunctional polythioethers are discussed in detail in U.S. Pat. No. 6,172,179, 8:62-12:22, incorporated herein by reference.

Non-limiting examples of suitable polyols include but are not limited to polyether polyols, polyester polyols, polycaprolactone polyols, polycarbonate polyols, polyurethane polyols, poly vinyl alcohols, polymers containing hydroxy functional acrylates, polymers containing hydroxy functional methacrylates, polymers containing allyl alcohols, hydroxyl functional polybutadienes, and mixtures thereof.

The nucleophile may comprise a carboxylic acid containing at least one carboxylate functional group. Suitable carboxylic acids include phthalic acid, hexahydrophthalic acid, maleic acid, succinic acid, adipic acid, or any polymers containing acid groups.

The nucleophile may comprise an anhydride containing at least one anhydride functional group. Suitable anhydride-containing compounds include hexahydrophthalic anhydride, phthalic anhydride, maleic anhydride, succinic anhydride, trimelletic anhydride, pyromellitic dianhydride, 3,3',4,4'-oxydiphthalic dianhydride, 3,3',4,4'-benzopherone tetracarboxylic dianhydride, 4,4'diphthalic anhydride, or any polymers containing anhydride groups.

The nucleophile may be present in the composition in an amount of at least 1% by volume based on total volume of the composition, such as at least 3% by volume, such as at least 5% by volume, and may be present in the composition in an amount of no more than 89% by volume based on total volume of the composition, such as no more than 85% by volume, such as no more than 80% by volume. The nucleophile may be present in the composition in an amount of 1% by volume to 89% by volume based on total volume of the composition, such as 3% by volume to 85% by volume, such as 5% by volume to 80% by volume.

The nucleophile may be present in the composition in an amount such that the volume ratio of the electrophile to the nucleophile may be at least 1:100, such as at least 1:90, such as at least 1:29, such as at least 1:16, and may be no more than 1000:1, such as no more than 90:1 such as no more than 29:1, such as no more than 16:1. The nucleophile may be present in the composition in an amount such that the volume ratio of the electrophile to the nucleophile may be 1:100 to 1000:1, such as 1:90 to 90:1, such as 1:29 to 29:1, such as 1:16 to 16:1.

The composition may comprise a reactive diluent. The reactive diluent may be a monomer or a polymer, and may be mono-functional, bi-functional, or multi-functional. The reactive diluent may, in some instances, be an electrophile or a nucleophile, or may be an adhesion promoter or a surface active agent. Suitable examples of reactive diluent include 1,4-butandiol diglycidyl ether (available as Heloxy modifier BD from Hexion), 1,6-hexanediol diglycidyl ether, monofunctional aliphatic diluents (Epotec RD 108, RD 109, RD 188 available from Aditya Birla), and mono-functional aromatic reactive diluents (Epotec RD 104, RD 105, and RD 136 available from Aditya Birla). Other suitable examples of the reactive diluent include saturated epoxidized oils, unsaturated oils such as glycerides of polyunsaturated fatty acids such as nut oils or seed oils, including as examples cashew nut oil, sunflower oil, safflower oil, soybean oil, linseed oil, castor oil, orange oil, rapeseed oil, tall oil, vegetable processing oil, vulcanized vegetable oil, high oleic acid sunflower oil, and combinations thereof. The reactive diluent of the present invention also may be homopolymers of 1,2-butadiene or 1,4-butadiene or combinations thereof, copolymers of butadiene and acrylic or olefin monomers, or combinations thereof.

The reactive diluent may have a boiling point of greater than 100° C., such as greater than 130° C., such as greater than 150° C., for example, and the reactive diluent may have a boiling point of less than 425° C., such as less than 390° C., such as less than 360° C., for example.

The reactive diluent can lower the viscosity of the mixture. According to the present invention, the reactive diluent may have a viscosity of from 1 mPa·s to 4,000 mPa·s at 25° C. according to ASTM D789, such as for example, from 1 mPa·s to 3,000 mPa·s, 1 mPa·s to 2,000 mPa·s, 1 mPa·s to 1,000 mPa·s, 1 mPa·s to 100 mPa·s, or 2 mPa·s to 30 mPa·s.

The compositions disclosed herein also comprise a thermally conductive filler package comprising particles of a thermally conductive, electrically insulative filler material (referred to herein as "TC/EI filler material" and described in more detail below). The TC/EI filler material may comprise organic or inorganic material and may comprise particles of a single type of filler material or may comprise a particles of two or more types of TC/EI filler materials. That is, the thermally conductive filler package may comprise particles of a first TC/EI filler material and may further comprise particles of at least a second (i.e., a second, a third, a fourth, etc.) TC/EI filler material that is different from the first TC/EI filler material. In an example, the particles of the first TC/EI filler material may have may have an average particle size that is at least one order of magnitude greater than an average particle size of the particles of the second TC/EI filler material, such as at least two orders of magnitude greater, such as at least three orders of magnitude greater, wherein the particle sizes may be measured, for example, using a SEM as described above. As used herein with respect to types of filler material, reference to "first," "second", etc. is for convenience only and does not refer to order of addition to the filler package or the like.

Optionally, as discussed in more detail below, the filler package also may comprise particles of thermally conductive, electrically conductive filler material (referred to herein as "TC/EC" filler material) and/or particles of non-thermally conductive, electrically insulative filler material (referred to herein as "NTC/EI" filler material). The filler materials may be organic or inorganic.

The TC/EC filler material may comprise particles of a single type of filler material or may comprise a particles of two or more types of thermally conductive, electrically conductive filler materials. That is, the thermally conductive filler package may comprise particles of a first TC/EC filler material and may further comprise particles of at least a second (i.e., a second, a third, a fourth, etc.) TC/EC filler material that is different from the first TC/EC filler material. In an example, the particles of the first TC/EC filler material may have may have an average particle size that is at least one order of magnitude greater than an average particle size of the particles of the second TC/EC filler material, such as at least two orders of magnitude greater, such as at least three orders of magnitude greater, wherein the particle sizes may be measured, for example, using a SEM as described above.

Likewise, the NTC/EI filler material may comprise particles of a single type of filler material or may comprise a particles of two or more types of NTC/EI filler materials. That is, the thermally conductive filler package may comprise particles of a first NTC/EI filler material and may further comprise particles of at least a second (i.e., a second, a third, a fourth, etc.) NTC/EI filler material that is different from the first NTC/EI filler material. In an example, the particles of the first NTC/EI filler material may have may have an average particle size that is at least one order of magnitude greater than an average particle size of the particles of the second NTC/EI filler material, such as at least two orders of magnitude greater, such as at least three orders of magnitude greater, wherein the particle sizes may be measured, for example, using a SEM as described above.

Particles of filler material used in the thermally conductive filler package may have a reported Mohs hardness of at least 1 (based on the Mohs Hardness Scale), such as at least 2, such as at least 3, and may have a reported Mohs hardness of no more than 10, such as no more than 8, such as no more than 7. Particles of filler material used in the thermally conductive filler package may have a reported Mohs hardness of 1 to 10, such as 2 to 8, such as 3 to 7.

Particles of filler material used in the thermally conductive filler package may have a reported average particle size in at least one dimension of at least 0.01 µm, as reported by the manufacturer, such as at least 2 µm, such as at least 10 µm, and may have a reported average particle size in at least one dimension of no more than 1000 µm as reported by the manufacturer, such as no more than 500 µm, such as no more than 300 µm, such as no more than 100 µm. The particles of filler material used in the thermally conductive filler package may have a reported average particle size in at least one dimension of 0.01 µm to 1000 µm as reported by the manufacturer, such as 0.1 µm to 500 µm, such as 2 µm to 300 µm, such as 10 µm to 100 µm. Suitable methods of measuring average particle size include measurement using an instrument such as the Quanta 250 FEG SEM or an equivalent instrument.

Particles of filler material used in the thermally conductive filler package may comprise a plurality of particles each having, for example, a platy, spherical, or modular shape, and agglomerates thereof.

Particles of filler material used in the thermally conductive filler package may be thermally conductive. The particles of thermally conductive filler material may have a thermal conductivity of at least 5 W/m·K at 25° C. (measured according to ASTM D7984), such as at least 18 W/m·K, such as at least 55 W/m·K, and may have a thermal conductivity of no more than 3,000 W/m·K at 25° C., such as no more than 1,400 W/m·K, such as no more than 450 W/m·K. The particles of a thermally conductive filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K.

Particles of filler material used in the thermally conductive filler package may be non-thermally conductive. The particles of non-thermally conductive filler material may have a thermal conductivity of less than 5 W/m·K at 25° C. (measured according to ASTM D7984, such no more than 3 W/m·K, such as no more than 1 W/mK, such as no more than 0.1 W/mK, such as no more than 0.05 W/mK. Thermal conductivity may be measured as described above.

Particles of filler material used in the thermally conductive filler package may be electrically insulative. The particles of electrically insulative filler material may have a volume resistivity of at least 10 Ω·m (measured according to ASTM D257, C611, or B193), such as at least 100 Ω·m.

Particles of filler material used in the thermally conductive filler package may be electrically conductive. The particles of electrically conductive filler material may have a volume resistivity of less than 10 Ω·m (measured according to ASTM D257, C611, or B193), such as less than 1 Ω·m.

The thermally conductive filler package may be present in the composition in an amount of at least 10% by volume based on total volume of the composition, such as at least 30% by volume, such as at least 50% by volume, and may be present in the composition in an amount of no more than 98% by volume based on total volume of the composition, such as no more than 80% by volume, such as no more than 70% by volume. The thermally conductive filler package may be present in the composition in an amount of 10% by volume to 89% by volume based on total volume of the composition, such as 30% to 80% by volume, such as 50% to 70% by volume.

As noted above, the thermally conductive filler package may comprise particles of TC/EI filler material.

Suitable TC/EI filler materials include boron nitride (for example, commercially available as CarboTherm from Saint-Gobain, as CoolFlow and PolarTherm from Momentive, and as hexagonal boron nitride powder available from Panadyne), silicon nitride, or aluminum nitride (for example, commercially available as aluminum nitride powder available from Micron Metals Inc., and as Toyalnite from Toyal), boron arsenide, metal oxides such as aluminum oxide (for example, commercially available as Microgrit from Micro Abrasives, as Nabalox from Nabaltec, as Aeroxide from Evonik, and as Alodur from Imerys), magnesium oxide, beryllium oxide, silicon dioxide, titanium oxide, zinc oxide, nickel oxide, copper oxide, or tin oxide, metal hydroxides such as aluminum trihydrate, aluminum hydroxide or magnesium hydroxide, arsenides such as boron arsenide, carbides such as silicon carbide, minerals such as agate and emery, ceramics such as ceramic microspheres (for example, commercially available from Zeeospheres Ceramics or 3M), silicon carbide, and diamond. These fillers can also be surface modified, such as PYROKISUMA 5301K available from Kyowa Chemical Industry Co., Ltd. These thermally conductive fillers may be used alone or in a combination of two or more.

The TC/EI filler particles may be present in an amount of at least 90% by volume based on total volume of the filler package, such as at least 93% by volume, such as at least 95% by volume, and may be present in an amount of no more than 100% by volume based on total volume of the filler package, such as no more than 98% by volume, such as no more than 97% by volume. The TC/EI filler particles may be present in an amount of 90% by volume to 100% by volume based on total volume of the filler package, such as 93% by volume to 98% by volume, such as 95% by volume to 97% by volume.

As noted above, the thermally conductive filler package may comprise particles of TC/EC filler material.

Suitable TC/EC filler materials include metals such as silver, zinc, copper, gold, or metal coated hollow particles. carbon compounds such as, graphite (such as Timrex commercially available from Imerys or ThermoCarb commercially available from Asbury Carbons), carbon black (for example, commercially available as Vulcan from Cabot Corporation), carbon fibers (for example, commercially available as milled carbon fiber from Zoltek), graphene and graphenic carbon particles (for example, xGnP graphene nanoplatelets commercially available from XG Sciences, and/or for example, the graphene particles described below), carbonyl iron, copper (such as spheroidal powder commercially available from Sigma Aldrich), zinc (such as Ultrapure commercially available from Purity Zinc Metals and Zinc Dust XL and XLP available from US Zinc), and the like Examples of "graphenic carbon particles" include carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

The TC/EC filler particles may be present in an amount of no more than 30 volume percent based on total volume of the filler package, such as no more than 10 volume percent, and may be present in an amount of at least 1 volume percent based on total volume of the filler package, such as at least 3 volume percent. The TC/EC filler particles may be present in an amount of 1 volume percent to 30 volume percent based on total volume of the filler package, such as 3 volume percent to 10 volume percent.

As noted above, the thermally conductive filler package may comprise particles of NTC/EI filler material.

Suitable NTC/EI filler materials include but are not limited to mica, silica, wallastonite, calcium carbonate, glass microspheres, clay, or combinations thereof.

As used herein, the term "mica" generally refers to sheet silicate (phyllosilicate) minerals. The mica may comprise muscovite mica. Muscovite mica comprises a phyllosilicate mineral of aluminum and potassium with the formula $KAl_2(AlSi_3O_{10})(F,OH)_2$ or $(KF)_2(Al_2O_3)_3(SiO_2)_6(H_2O)$. Exemplary non-limiting commercially available muscovite mica include products sold under the trade name DakotaPURE™, such as DakotaPURE™ 700, DakotaPURE™ 1500, DakotaPURE™ 2400, DakotaPURE™ 3000, DakotaPURE™ 3500 and DakotaPURE™ 4000, available from Pacer Minerals.

The silica ($SiO_2$) may comprise fumed silica which comprises silica that has been treated with a flame to form a three-dimensional structure. The fumed silica may be untreated or surface treated with a siloxane, such as, for example, polydimethylsiloxane. Exemplary non-limiting commercially available fumed silica includes products solder under the trade name AEROSIL®, such as AEROSIL® R 104, AEROSIL® R 106, AEROSIL® R 202, AEROSIL® R 208, AEROSIL® R 972 commercially available from Evonik Industries and products sold under the trade name HDK® such as HDK® H17 and HDK® H18 commercially available from Wacker Chemie AG.

Wollastonite comprises a calcium inosilicate mineral ($CaSiO_3$) that may contain small amounts of iron, aluminum, magnesium, manganese, titanium and/or potassium. The wollastonite may have a B.E.T. surface area of 1.5 to 2.1 $m^2/g$, such as 1.8 $m^2/g$ and a median particle size of 6 microns to 10 microns, such as 8 microns. Non-limiting examples of commercially available wollastonite include NYAD 400 available from NYCO Minerals, Inc.

The calcium carbonate ($CaCO_3$) may comprise a precipitated calcium carbonate or a ground calcium carbonate. The calcium carbonate may or may not be surface treated with stearic acid. Non-limiting examples of commercially available precipitated calcium carbonate include Ultra-Pflex®, Albafil®, and Albacar HO® available from Specialty Minerals and Winnofil® SPT available from Solvay. Non-limiting examples of commercially available ground calcium carbonate include Duramite™ available from IMERYS and Marblewhite® available from Specialty Minerals.

Useful clay minerals include a non-ionic platy filler such as talc, pyrophyllite, chlorite, vermiculite, or combinations thereof.

The glass microspheres may be hollow borosilicate glass. Non-limiting examples of commercially available glass microspheres include 3M Glass bubbles type VS, K series, and S series available from 3M.

The NTC/EI filler particles may be present in an amount of no more than 1 volume percent based on total volume of the filler package, such as no more than 0.5 volume percent, and may be present in an amount of at least 0.1 volume percent based on total volume of the filler package, such as at least 0.25 volume percent. The NTC/EI filler particles may be present in an amount of 0.1 volume percent to 1 volume percent based on total volume of the filler package, such as 0.25 volume percent to 0.5 volume percent.

Any catalyst capable of catalyzing a reaction of the electrophile with the nucleophile may be used in the present invention. Suitable catalysts that may be used in accordance with the present invention thus include for example quaternary amines, tertiary amines, cyclic tertiary amines, or secondary amines that react with an epoxy group of an epoxy-containing compound at room temperature to form a tertiary or quaternary amine, or secondary amines that react with a thiol group of a polythiol to form a thiolate ion that may further react with an epoxy group of an epoxy-containing compound to form a tertiary amine. As examples of tertiary amines, the catalyst may comprise an alkanolamine. As used herein, the term "alkanolamine" refers to a compound comprising a nitrogen atom bonded to at least one alkanol substituent comprising an alkyl group comprising a primary, secondary or tertiary hydroxyl group. The alkanolamine may have the general structure $R^1{}_nN(R^2-OH)_{3-n}$, wherein $R^1$ comprises hydrogen or an alkyl group, $R^2$ comprises an alkanediyl group, and n=0, 1 or 2. When n=2, two $R^1$ groups will be present, and these groups may be the same or different. When n=0 or 1, 2 or 3 $R^2-OH$ groups will be present, and these groups may be the same or different. The alkyl groups comprise aliphatic linear or branched carbon chains that may be unsubstituted or substituted with, for example, ether groups. Suitable alkanolamines include monoalkanolamines such as ethanolamine, N-methylethanolamine, 1-amino-2-propanol, and the like, dialkanolamines such as diethanolamine, diisopropanolamine, and the like, and trialkanolamines such as trimethanolamine, triethanolamine, tripropanolamine, tributanolamine, tripentanolamine, trihexanolamine, triisopropanolamine, and the like. As examples, the cyclic tertiary amine may comprise 1,4-diazabicyclo[2.2.2]octane ("DABCO"), 1,8-diazabicylo[5.4.0]undec-7-ene ("DBU"), 1,5-diazabicyclo[4.3.0]non-5-ene ("DBN"), 1,5,7-triazabicyclo[4.4.0]dec-5-ene ("TBD"), and combinations thereof. The quaternary amines may comprise tetrabutylammonium bromide, tetrabutylammonium chloride, and benzyltrimethylammonium bromide.

Additional examples of suitable catalysts include Lewis acid catalysts such as bismuth (K-Kat 348 commercially available from King Industries), zinc (K-Kat XK-635 and XK-672 commercially available from King Industries), and tin (dibutyltin dilaurate from Songwon or dibutylin diacetylacetonate available from Kaneka).

Additional examples of suitable unblocked catalysts include, pyridine, imidazole, dimethylaminopyridine, 1-methylimidazole, N,N'-carbonyldiimidazole, [2,2]bipyridine, 2,4,6-tris(dimethylamino methyl)phenol, 3,5-dimethylpyrazole, and combinations thereof.

The catalyst may be a blocked, or a latent, catalyst. Latent catalysts that may be used include guanidines, substituted guanidines, substituted ureas, melamine resins, guanamine derivatives, heat-activated cyclic tertiary amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. In addition, catalytically-active substituted ureas may also be used. Suitable catalytically-active substituted ureas include p-chlorophenyl-N,N-dimethylurea, 4,4'-methylenebis(phenyldimethyl urea), 1,1-dimethylurea, N-3-(dimethylamino)carbonylaminomethyl-3,5,5-trimethylcyclohexyl-N,N-dimethylurea, [1,1'-(4-methyl-m-phenylene)bis(3,3-dimethylurea), 3-phenyl-1,1-dimethylurea (fenuron) or 3,4-dichlorophenyl-N,N-dimethylurea (also known as Diuron).

The latent catalyst may also comprise a reaction product of reactants comprising (i) an epoxy compound, and (ii) an amine and/or an alkaloid. For example, the (b) heat-activated latent catalyst may comprise a reaction product of reactants comprising (i) an epoxy compound and (ii) an amine, or a reaction product of reactants comprising (i) an epoxy compound and (ii) an alkaloid. Such heat-activated latent curing catalysts are described in paragraphs [0098] through [0110] of U.S. Publication No. 2014/0150970, the cited portion of which is incorporated herein by reference. Examples of non-limiting commercially available second-step catalysts comprising a reaction product of reactants comprising (i) an epoxy compound, and (ii) an amine and/or an alkaloid include the products sold under the trade name Ajicure including Ajicure PN-23, Ajicure PN-H, Ajicure PN-31, Ajicure PN-40, Ajicure PN-50, Ajicure PN-23J, Ajicure PN-31J, Ajicure PN-40J, Ajicure MY-24 and Ajicure MY-2, available from Ajinomoto Fine-Techno Co., Inc.

The catalyst may be present in the composition in an amount of at least 0.01% by volume, based on the total weight of the electrophile, nucleophile, and catalyst, such as at least 0.02% by volume, such as at least 0.03% by volume, and may be present in an amount of no more than 30% by volume based on total weight of the electrophile, nucleophile, and catalyst, such as no more than 20% by volume, such as no more than 10% by volume. The latent catalyst may be present in the composition in an amount of 0.01% to 30% by volume based on the total volume of the electrophile, nucleophile, and catalyst, such as 0.02% to 20% by volume, such as 0.03% to 10% by volume.

According to the present invention, the composition may be substantially free, essentially free, or completely free of a latent catalyst. As used herein, a composition is "substantially free" of a latent catalyst if the latent catalyst is present in an amount of less than 0.001% by weight based on the total weight of the composition. As used herein, a composition is "essentially free" of a latent catalyst if the latent catalyst is present in an amount of less than 0.0005% by weight based on the total weight of the composition. As used herein, a composition is "completely free" of a latent catalyst if the latent catalyst is not present in the composition, i.e., 0.0000% by weight.

The composition optionally may further comprise a dispersant. As used herein, the term "dispersant" refers to a substance that may be added to the composition in order to improve the separation of the thermally conductive filler particles by wetting the particles and breaking apart agglomerates. The dispersant, if present at all, may be present in the composition in an amount of at least 0.05% by volume based on total volume of the thermally conductive filler package, such as at least 0.2% by volume, and may be present in an amount of no more than 20% by volume based on total volume of the thermally conductive filler package, such as no more than 10% by volume, such as no more than 3% by volume, such as no more than 1% by volume. The dispersant, if present at all, may be present in the composition in an amount of 0.05% by volume to 20% by volume based on total volume of the thermally conductive filler package, such as 0.2% by volume to 10% by volume, such as 0.2% by volume to 3% by volume, such as 0.2% by volume to 1% by volume. Suitable dispersants for use in the composition include fatty acid, phosphoric acid esters, polyurethanes, polyamines, polyacrylates, polyalkoxylates, sulfonates, polyethers, and polyesters, or any combination thereof. Non-limiting examples of commercially available dispersants include ANTI-TERRA-U100, DISPERBYK-102, DISPERBYK-103, DISPERBYK-111, DISPERBYK-171, DISPERBYK-2151, DISPERBYK-2059, DISPERBYK-2000, DISPERBYK-2117, and DISPERBYK-2118 available from BYK Company; and SOLSPERSE 24000SC, SOLSPERSE 16000 and SOLSPERSE 8000 hyperdispersants available from The Lubrizol Corporation.

The composition may optionally comprise a rheology modifier, a tackifier, an accelerator, a thermoplastic polymer, a thixotrope, a surface active agent, a colorant, a tint and/or other materials.

The thixotrope may be present in the composition in an amount of at least 0.01% by volume based on total volume of the composition, such as at least 0.2% by volume, and in some instances may be present in the composition in an amount of no more than 5% by volume based on total volume of the composition, such as no more than 3% by volume, such as no ore than 1% by volume. The thixotrope may be present in the composition in an amount of 0.01% by volume to 5% by volume based on total volume of the composition, such as 0.2% by volume to 3% by volume, such as 0.2% by volume to 1% by volume. Useful thixotropes that may be used include polyamide, polyether phosphate, oxidized polyolefin, Castor wax and organoclay. Commercially available thixotropes useful in the present invention include Disparlon 6500 available from King Industries, Garamite 1958 available from BYK Company, Bentone SD2 and Thxatrol@ST available from Elementis, and Crayvallac SLX available from Palmer Holland. Useful colorants or tints may include phthalocyanine blue.

The composition optionally may comprise at least one plasticizer. Examples of plasticizers include diisononylphthalate (Jayflex™ DINP available from Exxon Mobil), diisodecylphthalate (Jayflex™ DIDP available from Exxon Mobil), and alkyl benzyl phthalate (Santicizer 278 available from Valtris); benzoate-based plasticizers such as dipropylene glycol dibenzoate (K-Flex® available from Emerald Performance Materials); and other plasticizers including terephthalate-based dioctyl terephthalate (DEHT available from Eastman Chemical Company), alkylsulfonic acid ester of phenol (Mesamoll available from Borchers), and 1,2-cyclohexane dicarboxylic acid diisononyl ester (Hexamoll DINCH available from BASF). These plasticizers can be polymers such as polyacrylates.

The plasticizer may be present in the composition in an amount of at least 0.5% by volume based on the total volume of the electrophile, nucleophile, and plasticizer, such as at least 2% by volume, such as at least 3% by volume, and may be present in an amount of no more than 30% by volume based on total volume of the electrophile, nucleophile, and plasticizer, such as no more than 20% by volume, such as no more than 16% by volume. The plasticizer may be present in the composition in an amount of 0.5% to 30% by volume based on total weight of the electrophile, nucleophile, and plasticizer, such as 2% to 20% by volume, such as 3% to 16% by volume.

The composition also may comprise at least one elastomer, such as a reactive or non-reactive elastomeric resin. Examples of commercially available non-reactive elastomers include Polyvest® polybutadiene available from Evonik. Examples of reactive elastomers include Hypro® ATBN amine-functional butadiene copolymer available from Emerald Performance Materials.

The elastomer may be present in the composition in an amount of at least 2% by volume based on the total volume of the electrophile, nucleophile, and elastomer, such as at least 5% by volume, such as at least 6% by volume, and may be present in an amount of no more than 40% by volume based on total volume of the electrophile, nucleophile, and elastomer, such as no more than 30% by volume, such as no more than 22% by volume. The plasticizer may be present in the composition in an amount of 2% to 40% by volume based on total volume of the electrophile, nucleophile, and elastomer, such as 5% to 30% by volume, such as 6% to 22% by volume.

The composition may also comprise at least one silane terminated polymer. The silane terminated polymer may be capable of crosslinking in the presence of moisture. The polymer may be an alkoxysilane-terminated polyether, an alkoxyilane-terminated polyurethane, or combinations thereof. The alkoxysilane can be methoxy or ethoxy silane, with one, two, or three alkoxy groups per silane. Commercial examples of alkoxysilane-terminated polymers include the Kaneka MS polymers such as SAX 350, SAX 400, and SAX 750 or the Wacker STP-E series such as STP-E30.

The silane terminated polymer, if present at all, may be present in the composition in an amount of up to 70% by volume based on total volume of electrophile, nucleophile, and silane terminated polymer, such as up to 50% by volume, such as up to 25% by volume. For example, the silane terminated polymer may be present in the composition in an amount of 0.1% by volume to 70% by volume based on total volume of electrophile, nucleophile, and silane terminated polymer, such as 1% by volume to 50% by volume, such as 5% by volume to 25% by volume.

The composition also may comprise a solvent. Suitable solvents include toluene, acetone, ethyl acetate, xylene, and combinations thereof.

The solvent may be present in the composition in an amount of at least 1% by volume based on the total volume of the composition, such as at least 2% by volume, such as at least 5% by volume, and may be present in an amount of no more than 60% by volume, such as no more than 40% by volume, such as no more than 20% by volume. The solvent may be present in the composition in an amount of 1% to 60% by volume based on total volume of the composition, such as 2% to 40% by volume, such as 5% to 20% by volume.

The composition according to the present invention optionally may further comprise an adhesion promoter, antioxidant, water scavenger, and the like, in amounts known to those skilled in the art.

Optionally, the compositions disclosed herein may be substantially free, or essentially free, or completely free, of silicone containing components including polymerized siloxanes or polysiloxanes, and silicone containing oligomers or polymers that include a silicon-oxygen backbone chain. As used herein, the term "silicone" does not include "silane," e.g., the composition may include a silane but may also be substantially free, or essentially free, or completely free, of silicon. As used herein, the term "silane" refers to polymers that include silyl-containing and/or silane-containing pendant or terminal groups. For example, the silane or silyl group may be attached to the Si atom. For example, the silane or silyl group may be represented by the formula —Si(Y3-mAm) where Y is a functional group that is both hydrolysable and condensable, A is a C1 to C4 hydrocarbon group, and m=0 to 2.

The total composition of the 1K or the 2K compositions disclosed herein may have a viscosity of at least 10 cP at a shear stress of 800 Pa as measured by an Anton Paar MCR 301 rotational rheometer at 25° C. using a parallel plate with a diameter of 25 mm (1 mm gap), such as at least $10^3$ cP, and may have a viscosity of no more than $10^8$ cP as measured by an Anton Paar MCR 301 rotational rheometer at 25° C. using a parallel plate with a diameter of 25 mm (1 mm gap), such as no more than $10^5$ cP. The total composition may have a viscosity of 10 cP to $10^8$ cP at a shear stress of 800 Pa as measured by an Anton Paar MCR 301 rotational rheometer at 25° C. using a parallel plate with a diameter of 25 mm (1 mm gap), such as $10^3$ cP to 105 cP. Additionally, in the case of the 2K compositions disclosed herein, the first component (with or without filler materials) and the second component (with or without filler materials) may have a viscosity of at least 10 cP at a shear stress of 800 Pa as measured by an Anton Paar MCR 301 rotational rheometer at 25° C. using a parallel plate with a diameter of 25 mm (1 mm gap), such as at least $10^3$ cP, and may have a viscosity of no more than $10^8$ cP as measured by an Anton Paar MCR 301 rotational rheometer at 25° C. using a parallel plate with a diameter of 25 mm (1 mm gap), such as no more than $10^5$ cP. The first component (with or without filler materials) and the second component (with or without filler materials) may have a viscosity of 10 cP to $10^8$ cP at a shear stress of 800 Pa as measured by an Anton Paar MCR 301 rotational rheometer at 25° C. using a parallel plate with a diameter of 25 mm (1 mm gap), such as $10^3$ cP to 105 cP.

The compositions disclosed herein may be 1K compositions comprising, or consisting essentially of, or consisting of, an electrophile, a nucleophile, and a thermally conductive filler package, and optionally a latent catalyst and/or a dispersant and/or any of the additives described hereinabove.

The compositions disclosed herein may be 2K compositions comprising, or consisting essentially of, or consisting of, a first component comprising, or consisting essentially of, or consisting of, an electrophile, a second component comprising, or consisting essentially of, or consisting of, a nucleophile, and a thermally conductive filler package that may be present in the first component and/or the second component, and optionally a catalyst and/or a dispersant and/or any of the additives described herein above may be present in the first component and/or the second component.

The compositions disclosed herein may be 3K or higher compositions comprising, or consisting essentially of, or consisting of, a first component comprising, or consisting essentially of, or consisting of, an electrophile, a second component comprising, or consisting essentially of, or consisting of, a nucleophile, and a third component comprising, or consisting essentially of, or consisting of, a thermally conductive filler package, and optionally a catalyst and/or a dispersant and/or any of the additives described herein above may be present in the first component and/or the second component and/or the third component.

It has been surprisingly discovered that the coating compositions of the present invention are workable for at least 10 days, such as at least 20 days, such as at least 30 days, when stored at ambient conditions.

The composition may have a total solids content of at least 40% by volume based on total volume of the composition, such as at least 60%, such as at least 80% by volume, and may have a total solids content of no more than 100% by volume based on total volume of the composition. The composition may have a total solids content of 40% to 100% by volume based on total volume of the composition, such as 60% to 100%, such as 80% to 100% by volume. As used herein, "total solids" refers to the non-volatile content of the composition, i.e., materials which will not volatilize when heated to 105° C. and standard atmospheric pressure (101325 Pa) for 60 minutes.

In the case of a 2K composition, one of the components may be substantially free, or essentially free, or completely free, of filler materials, and in the case of a 3K composition, one or two of the components may be substantially free, or essentially free, or completely free, of filler materials.

The composition may be a low-VOC composition. As used herein, the term "low-VOC" refers to a composition having a theoretical VOC wt % of less than 7% by weight, such as less than 3% by weight, such as less than 2% by weight, based on total weight of the composition. The theoretical volatile organic content ("VOC") may be less than 105 g/L, such as less than 75 g/L, such as less than 30 g/L. As used herein, $$VOC \text{ wt \%} = \frac{\text{Sum of the weight of all } VOC \text{ compounds}}{\text{Total Formula Weight}}, \text{ and}$$

$$VOC \text{ (g/L)} = \frac{VOC \text{ \% wt}}{100} * \text{Formula Density}$$
$$(\text{lb./Gallon}) * 453.592 \text{ (g/lb.)} * \frac{1}{3.78541 \text{ Liters/Gallon}}.$$

The composition of the present invention may comprise, or consist essentially of, or consist of, an electrophile and a nucleophile that reacts with the electrophile, and a thermally conductive filler package as described above. As used herein, the composition "consists essentially of" an electrophile and a nucleophile that reacts with the electrophile, a first thermally conductive filler, and a catalyst means when the maximum amount of other components is 5% by volume or less based on total volume of the composition.

The present invention may also be a method for preparing a composition comprising, or in some cases consisting of, or in some cases consisting essentially of, an electrophile, a nucleophile that reacts with the electrophile, a thermally conductive filler package, and optionally a catalyst, and optionally a dispersant, and any of the optional further components, if used, described above, the method comprising, or in some cases consisting of, or in some cases consisting essentially of, mixing the polyfunctional electrophile, a nucleophile that reacts with the polyfunctional electrophile, a thermally conductive filler package, and optionally a catalyst, and optionally a dispersant and the optional component(s), if used, at a temperature of less than 50° C., such as from 0° C. to 50° C., such as from 15° C. to 35° C., such as at ambient temperature.

The composition described above may be applied alone or as part of a system that can be deposited in a number of different ways onto a number of different substrates. The system may comprise a number of the same or different films, coatings, or layers. A film, coating, or layer is typically formed when a composition that is deposited onto at least a portion of the substrate surface is at least partially dried or cured by methods known to those of ordinary skill in the art (e.g., under ambient conditions or by exposure to thermal heating).

The composition can be applied to the surface of a substrate in any number of different ways, non-limiting examples of which include brushes, rollers, films, pellets, trowels, spatulas, dips, spray guns and applicator guns to form a coating on at least a portion of the substrate surface.

Alternatively, the composition may be casted, extruded, moulded, or machined to form a part or a member in at least partially dried or cured state.

The 2K compositions disclosed herein surprisingly may be used in any suitable additive manufacturing technology, such as extrusion, jetting, and binder jetting.

The present disclosure is directed to the production of structural articles, such as by way of non-limiting example, sound damping pads, using three-dimensional printing. A three-dimensional article may be produced by forming successive portions or layers of an article by depositing the composition of the present invention onto a substrate and thereafter depositing additional portions or layers of the composition over the underlying deposited portion or layer and/or adjacent the previously deposited portion or layer. Layers can be successively deposited adjacent a previously deposited layer to build a printed article. First and second components of the composition can be mixed and then deposited or the first and second components of the composition can be deposited separately. When deposited separately, the first and second components can be deposited simultaneously, sequentially, or both simultaneously and sequentially.

By "portions of an article" is meant subunits of an article, such as layers of an article. The layers may be on successive horizontal parallel planes. The portions may be parallel planes of the deposited material or beads of the deposited material produced as discreet droplets or as a continuous stream of material. The first and second components may each be provided neat or may also include a solvent (organic and/or water) and/or other additives as described below. First and second components provided by the present disclosure may be substantially free of solvent. By substantially free is meant that the first and second components comprise less than 5 wt %, less than 4 wt %, less than 2 wt %, or less than 1 wt % of solvent, where wt % is based on the total weight of the first component or the second component, as the case may be. Similarly, the composition provided by the present disclosure may be substantially free of solvent, such as having less than 5 wt %, less than 4 wt %, less than 2 wt %, or less than 1 wt % of solvent, where wt % is based on the total weight of the composition.

The first and second components may be mixed together and subsequently deposited as a mixture of components that react to form portions of an article. For example, two components may be mixed together and deposited as a mixture of components that react to form a thermoset by delivery of at least two separate streams of the components into a mixer such as a static mixer and/or a dynamic mixer to produce a single stream that is then deposited. The components may be at least partially reacted by the time a composition comprising the reaction mixture is deposited. The deposited reaction mixture may react at least in part after deposition and may also react with previously deposited portions and/or subsequently deposited portions of the article such as underlying layers or overlying layers of the article.

Two or more components can be deposited using any suitable equipment. The selection of suitable deposition equipment depends on a number of factors including the deposition volume, the viscosity of the composition and the complexity of the part being fabricated. Each of the two or more components can be introduced into an independent pump and injected into a mixer to combine and mix the two components. A nozzle can be coupled to the mixer and the mixed composition can be pushed under pressure or extruded through the nozzle.

A pump can be, for example, a positive displacement pump, a syringe pump, a piston pump, or a progressive cavity pump. The two pumps delivering the two components can be placed in parallel or placed in series. A suitable pump can be capable of pushing a liquid or viscous liquid through a nozzle orifice. This process can also be referred to as extrusion. A component can be introduced into the mixer using two pumps in series.

For example, the first and second components can be deposited by dispensing materials through a disposable nozzle attached to a progressive cavity two-component dosing system such as a ViscoTec eco-DUO 450 precision dosing system, where the first and second components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the materials of the first and second components form an extrudate which can be deposited onto a surface to provide an initial layer of material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined components, i.e., a composition, that have been mixed, for example, in a static mixer or in a dynamic mixer. The extrudate can be shaped upon passing through a nozzle.

The base, the deposition system, or both the base and the deposition system may be moved to build up a three-dimensional article. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of reactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two components and feed the materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the first and second components. The dispensing section can be, for example, a straight tube having any of the above orifice diameters. The length of the dispensing section can be configured to provide a region in which the components can begin to react and build viscosity before being deposited on the article. The length of the dispensing section can be selected, for example, based on the speed of deposition, the rate of reaction of the first and second components, and the desired viscosity.

First and second components can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the composition. A suitable gel time can be less than 10 min, less than 8 min, less than 6 min, less than 5 min, less than 4 min, less than 3 min, less than 2 min, or less than 1 min. A gel time of the composition can be, for example, from 0.5 min to 10 min, from 1 min to 7 min, from 2 min to 6 min, or from 3 min to 5 min.

Compositions provided by the present disclosure can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL min. The volume flow rate can depend, for example, on the viscosity of the composition, the extrusion pressure, the nozzle diameter, and the reaction rate of the first and second components.

A composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The printed speed can depend, for example, on the viscosity of the composition, the extrusion pressure, the nozzle diameter, and the reaction rate of the components. The print speed refers to the speed at which a nozzle used to extrude a composition move with respect to a surface onto which the composition is being deposited.

A composition can have a gel time, for example, less than 5 minutes, less than 4 minutes, less than 3 minutes, less than 2 minutes, less than 1 minute, less than 45 seconds, less than 30 seconds, less than 15 seconds, or less than 5 seconds. A composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time is considered as the time following mixing when the composition is no longer stirrable by hand.

A static and/or dynamic mixing nozzle can be heated or cooled to control, for example, the rate of reaction between the first and second components and/or the viscosity of the first and second components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the first and second components.

Methods provided by the present disclosure include printing the composition on a fabricated part. Methods provided by the present disclosure include directly printing parts.

Using the methods provided by the present disclosure parts can be fabricated. The entire part can be formed from one of the compositions disclosed herein, one or more portions of a part can be formed from one of the compositions disclosed herein, one or more different portions of a part can be formed using the compositions disclosed herein, and/or one or surfaces of a part can be formed from a composition provided by the present disclosure. In addition, internal regions of a part can be formed from a composition provided by the present disclosure.

After application to the substrate(s), the composition may be cured. For example, the composition may be allowed to cure at room temperature or slightly thermal conditions and/or the composition may be cured by baking and/or curing at elevated temperature, such as at a temperature of 180° C. or below, such as 130° C. or below, such as 110° C. or below, such as 100° C. or below, such as 90° C. or below, such as 80° C. or below, such as 70° C. or below, but greater than ambient, such as greater than 40° C., such as greater than 50° C., and for any desired time period (e.g., from 5 minutes to 1 hour) sufficient to at least partially cure the composition on the substrate(s). Alternatively, the composition of the present invention may cure at ambient or slightly above ambient conditions.

The present invention also is directed to a method for treating a substrate comprising, or consisting essentially of, or consisting of, contacting at least a portion of a surface of the substrate with one of the compositions of the present invention described hereinabove. The composition may be cured to form a coating, layer or film on the substrate surface under ambient conditions or by exposure to an external energy source, for example such as by heating the substrate to a temperature of less than 180° C., such as less than 130° C., such as less than 90° C. The coating, layer or film, may be, for example, a sealant, a gap filler, or an adhesive.

The present invention is also directed to a method for forming a bond between two substrates for a wide variety of potential applications in which the bond between the substrates provides particular mechanical properties related to lap shear strength. The method may comprise, or consist essentially of, or consist of, applying the composition described above to a first substrate; contacting a second substrate to the composition such that the composition is located between the first substrate and the second substrate; and curing the composition under ambient conditions or by exposure to an external energy source, for example such as by heating to a temperature of less than 180° C., such as less than 130° C., such as less than 90° C. For example, the composition may be applied to either one or both of the substrate materials being bonded to form an adhesive bond therebetween and the substrates may be aligned and pressure and/or spacers may be added to control bond thickness. The composition may be applied to cleaned or uncleaned (i.e., including oily or oiled) substrate surfaces.

As stated above, the composition of the present disclosure also may form a sealant on a substrate or a substrate surface. The sealant composition may be applied to substrate surfaces, including, by way of non-limiting example, a vehicle body or components of an automobile frame or an airplane. The sealant formed by the composition of the present invention provides sufficient sound damping, tensile strength and tensile elongation. The sealant composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat. The coating composition may dry or cure at ambient conditions once applied to a substrate or substrates coated with coating compositions may optionally subsequently be baked in an oven to cure the coating composition.

The composition may be injected or otherwise placed in a die caster or a mould and at least partially dried or cured under ambient conditions or by exposure to an external energy source, for example such as by heating to a temperature of less than 180° C., such as less than 130° C., such as less than 90° C. to form a part or a member and optionally may be machined to a particular configuration.

The composition of the present invention, in an at least partially dried or cured state, surprisingly may demonstrate at least one of the following:
(a) a thermal conductivity of at least 0.5 W/m·K as measured using a Modified Transient Plane Source (MTPS) method (conformed to ASTM D7984) with a TCi thermal conductivity analyzer from C-Therm Technologies Ltd.;
(b) a volume resistivity of at least $1 \times 10^9$ Ω·m (measured according to ASTM D257, C611, or B193) on a Keysight B2987A Electrometer/High Resistance Meter connected to a 16008B Resistivity Cell;
(c) a dielectric strength of at least 1 kV/mm measured according to ASTM D149 on a dielectric meter (Sefetec RMG12AC-DC) connected to two copper electrodes with 1 inch diameter;
(d) a shore A hardness 5 to 95 measured according to ASTM D2240 with a Type A durometer (Model 2000, Rex Gauge Company, Inc.) at room temperature;
(e) a shore D hardness of 5 to 95, such as at least 20, such as at least 40, such as at least 60, measured according to ASTM D2240 standard with a Type D durometer (Model 2000, Rex Gauge Company, Inc.) at room temperature;
(f) a shore OO hardness of less than 90 measured according to ASTM D2240 with a Type OO durometer (Model AD-100-OO, Checkline);
(g) a tensile strength of 0.01 MPa to 1,000 MPa, as determined according to ASTM D412 using an Instron 5567 machine in tensile mode with a pull rate of 1 mm per minute;
(h) an elongation of 1% to 300%;
(i) a lap shear strength of at least 0.01 MPa (measured according to ASTM D1002-10 using an Instron 5567 machine in tensile mode with a pull rate of 1 mm per minute);
(j) a butt joint test strength of 0.001 N/mm$^2$ to 500 N/mm$^2$ (measured according to ASTM D2095); and/or
(k) a sound damping loss factor of at least 0.1 at 20° C. and 200 Hz, 4 kg/m$^2$, using the Oberst test method.

The substrates that may be coated by the compositions of the present invention are not limited. Suitable substrates useful in the present invention include, but are not limited to, materials such as metals or metal alloys, polymeric materials such as hard plastics including filled and unfilled thermoplastic materials or thermoset materials, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

FIG. 1 is a schematic perspective view illustrating a thermally conductive member utilized as a gap filler in a battery pack 100. As illustrated, the thermally conductive matter 10 (formed from the compositions described herein in an at least partially cured state) is positioned between two battery cells/battery modules 50 which are interconnected in series or in parallel by interconnects (not shown). The thermally conductive matter 10 also may be positioned between a cooling fin 30 and/or a battery cell/battery module 50, between battery modules 50, between a cooling plate 40 and a battery cell/battery module 50, between a battery cell/battery module 50 and a surface of a wall of a battery box 20, or may be applied as a coating on at least a portion of the substrate of a wall of a battery box 20. The battery pack may further comprise a thermal management system (not shown) comprising air or fluid circuits, which may be liquid based (for example glycol solutions) or direct refrigerant based.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing the present invention thus relates inter alia, without being limited thereto, to the following aspects:

Aspect 1. A composition, comprising:
a polyfunctional electrophile;
a polyfunctional nucleophile; and
a first thermally conductive filler having a thermal conductivity of at least at least 5 W/m·K as measured using a Modified Transient Plane Source (MTPS) method (conformed to ASTM D7984) with a TCi thermal conductivity analyzer from C-Therm Technologies Ltd.;

wherein the electrophile, the nucleophile, and the first thermally conductive filler have a combined viscosity of 10 cP to $10^8$ cP at a shear stress of 800 Pa as measured by an Anton Paar MCR 301 rotational rheometer at 25° C. using a parallel plate with a diameter of 25 mm (1 mm gap).

Aspect 2. The composition of Aspect 1, wherein the first thermally conductive filler is present in the composition in an amount of 2% by volume to 85% by volume based on total volume of the composition.

Aspect 3. The composition of Aspect 1 or Aspect 2, wherein particles of the first thermally conductive filler each have an average particle size in at least one dimension of 0.01 μm to 500 μm, as measured using SEM.

Aspect 4. The composition of any one of preceding Aspects 1 to 3, further comprising a second thermally conductive filler.

Aspect 5. The composition according to preceding Aspect 4, wherein the second thermally conductive filler is present in the composition in an amount of 0.9% by volume to 42% by volume based on total volume of the composition.

Aspect 6. The composition according to any one of the preceding Aspects 4 or 5, wherein the first thermally conductive filler has an average particle size that is at least one order of magnitude greater than an average particle size of the second thermally conductive filler, wherein the particle sizes are measured using SEM or the second thermally conductive filler has an average particle size that is at least one order of magnitude greater than an average particle size of the first thermally conductive filler, wherein the particle sizes may be measured, for example, using SEM.

Aspect 7. The composition according to any one of preceding Aspects 4 to 6, wherein particles of the second thermally conductive filler each have an average particle size in at least one dimension of 0.01 μm to 500 μm, as measured using a SEM.

Aspect 8. A composition, comprising:
an electrophile;
a nucleophile; and
a thermally conductive filler package comprising thermally conductive, electrically insulative filler particles, the thermally conductive, electrically insulative filler particles having a thermal conductivity of at least 5 W/m·K (measured according to ASTM D7984) and a volume resistivity of at least 10 Ω·m (measured according to ASTM D257, C611, or B193), the thermally conductive, electrically insulative filler particles being present in an amount of at least 90% by volume based on total volume of the filler package;
wherein the thermally conductive filler package is present in an amount of 10% by volume percent to 98% by volume based on total volume of the composition.

Aspect 9. The composition of Aspect 8, wherein the composition has a viscosity of 10 cP to $10^8$ cP at a shear stress of 800 Pa as measured by an Anton Paar MCR 301 rotational rheometer at 25° C. using a parallel plate with a diameter of 25 mm (1 mm gap).

Aspect 10. The composition of Aspect 8 or Aspect 9, wherein the electrophile and/or the nucleophile is monofunctional.

Aspect 11. The composition of Aspect 8 or Aspect 9, wherein the electrophile and/or the nucleophile is polyfunctional.

Aspect 12. The composition according to any one of Aspects 1 to 11, wherein the electrophile is present in an amount of 1% by volume to 90% by volume based on total volume of the composition.

Aspect 13. The composition according to any one of Aspects 1 to 12, wherein the electrophile comprises an epoxy-containing compound, a carbonate-containing compound, an isocyanate-containing compound, or combinations thereof.

Aspect 14. The composition according to any one of Aspects 1 to 13, wherein the electrophile comprises an epoxy-containing compound having at least one functional group that is different from the epoxide functional group.

Aspect 15. The composition according to any one of Aspects 1 to 14, wherein the electrophile comprises an isocyanate-containing compound having at least one functional group that is different from the isocyanate functional group.

Aspect 16. The composition of any one of Aspects 1 to 15, wherein the nucleophile is present in the composition in an amount of 1% by volume to 90% by volume based on total volume of the composition.

Aspect 17. The composition of any one of Aspects 1 to 17, wherein the nucleophile comprises an amine, a thiol, a polyol, a carboxylic acid, an anhydride, or combinations thereof.

Aspect 18. The composition of any one of Aspects 1 to 17, wherein the nucleophile is blocked or wherein the nucleophile is unblocked or wherein the nucleophile is encapsulated or wherein the nucleophile is unencapsulated.

Aspect 19. The composition of any one of Aspects 1 to 18, wherein a volume ratio of electrophile to nucleophile is 1:90 to 90:1.

Aspect 20. The composition of any one of Aspects 8 to 19, wherein the filler package further comprises thermally conductive, electrically conductive filler particles having a thermal conductivity of at least 5 W/m·K (measured according to ASTM D7984) and a volume resistivity of less than 10 Ω·m (measured according to ASTM D257, C611, or B193), the thermally conductive, electrically conductive filler particles being present in an amount of no more than 10% by volume based on total volume of the filler package.

Aspect 21. The composition of any one of Aspects 8 to 20, wherein the thermally conductive, electrically conductive filler particles have an average particle size in at least one dimension of no more than 5 μm, as measured using SEM.

Aspect 22. The composition of any of Aspects 8 to 21, wherein the filler package further comprises non-thermally conductive, electrically insulative filler particles having a thermal conductivity of less than 5 W/m·K (measured according to ASTM D7984) and a volume resistivity of at least 10 Ω·m (measured according to ASTM D257, C611, or B193), the thermally conductive, electrically conductive filler particles being present in an amount of no more than 1% by volume based on total volume of the filler package.

Aspect 23. The composition of any one of Aspects 1 to 22, wherein the thermally conductive filler has a Mohs hardness of no more than 10.

Aspect 24. The composition of any one of Aspects 1 to 23, wherein the thermally conductive filler has a Mohs hardness of 2-8, such as 3-7.

Aspect 25. The composition of any one of Aspects 1 to 24, further comprising a catalyst.

Aspect 26. The composition of Aspect 25, wherein the catalyst comprises a latent catalyst, such as a latent catalyst that is blocked or encapsulated.

Aspect 27. The composition of Aspect 25, wherein the catalyst comprises an active catalyst.

Aspect 28. The composition of any one of Aspects 25 to 27, wherein the catalyst is present in an amount of 0.05% to 16% by volume based on total volume of the electrophile, the nucleophile, and the curing catalyst.

Aspect 29. The composition according to any one of Aspects 8 to 28, further comprising at least one non-thermally conductive filler.

Aspect 30. The composition according to Aspect 29, wherein the non-thermally conductive filler is present in the composition in an amount of 1% by volume to 40% by volume based on total volume of the composition.

Aspect 31. The composition according to any one of Aspects 1 to 30, further comprising a dispersant.

Aspect 32. The composition according to Aspect 31, wherein the dispersant is present in an amount of 0.01% by volume to 88% by volume based on total volume of the composition.

Aspect 33. The composition according to any one of Aspects 1 to 32, further comprising a solvent, a plasticizer, an adhesion promoter, an antioxidant, a water scavenger, a thixotrope, a colorant, a tint, an elastomer, a tackifier, a thermoplastic polymer, a dispersant, a silane, a silane terminated polymer, a silyl terminated polymer, an accelerator, and/or a reactive diluent.

Aspect 34. The composition according to any one of Aspects 1 to 33, wherein the composition comprises a total solids content of 10% by volume to 100% by volume based on total volume of the composition.

Aspect 35. The composition according to any one of Aspects 1 to 34, wherein the composition is substantially free of volatile organic content.

Aspect 36. The composition of any one of Aspects 1 to 35, wherein the composition is substantially free of silicone.

Aspect 37. The composition of any one of Aspects 1 to 36, wherein the composition comprises a one-component composition.

Aspect 38. The composition of any one of Aspects 1 to 37, wherein the composition comprises a two-component composition.

Aspect 39. The composition according to any one of preceding Aspects 1 to 38, wherein the coating composition comprises a gap filler composition, a sealant composition, an adhesive composition, a putty, and/or a three-dimensionally printable composition.

Aspect 40. A method for treating a substrate comprising:
contacting a surface of the substrate with a composition of any one of Aspects 1 to 39;
optionally exposing the substrate to a temperature of 250° C. or less.

Aspect 41. A coated substrate, wherein the coated substrate is at least partially coated with the composition according to any one of preceding Aspects 1 to 39.

Aspect 42. A substrate treated according to the method of Aspect 40.

Aspect 43. The substrate of any of Aspects 40 to 42, wherein the coating has at least one of the following:
 (a) a thermal conductivity of at least 0.5 W/m·K (measured according to ASTM D7984);
 (b) a volume resistivity of at least $1 \times 10^9$ Ω·m (measured according to ASTM D257, C611, or B193);
 (c) a dielectric strength of at least 1 kV/mm measured according to ASTM D149 on a dielectric meter (Sefetec RMG12AC-DC) connected to two copper electrodes with 1 inch diameter;
 (d) a shore A hardness 5 to 95 measured according to ASTM D2240 with a Type A durometer (Model 2000, Rex Gauge Company, Inc.) at room temperature;
 (e) a shore D hardness of 5 to 95 measured according to ASTM D2240 standard with a Type D durometer (Model 2000, Rex Gauge Company, Inc.) at room temperature;
 (f) a shore OO hardness of less than 90 measured according to ASTM D2240 with a Type OO durometer (Model AD-100-OO, Checkline);
 (g) a lap shear strength of at least 0.5 MPa (measured according to ASTM D1002-10 using an Instron 5567 machine in tensile mode with a pull rate of 1 mm per minute);
 (h) a butt joint test strength of 0.001 N/mm$^2$ to 500 N/mm$^2$ (measured according to ASTM D2095);
 (i) a tensile strength of 0.1 MPa to 1,000 MPa, as determined according to ASTM D412 using an Instron 5567 machine in tensile mode with a pull rate of 1 mm per minute;
 (j) an elongation of 1% to 300%; and/or
 (h) a sound damping loss factor of at least 0.1 at 20° C. and 200 Hz, 4 kg/m$^2$, using the Oberst test method.

Aspect 44. The substrate of any of Aspects 40 to 43, further comprising a film, a second layer, or a coating positioned between the substrate surface and the layer formed from the composition according to any of Aspects 1 to 39 and/or positioned over the layer formed from the composition formed from the composition of any of Aspects 1 to 39.

Aspect 45. A thermally conductive part at least partially coated with the composition according to any one of Aspects 1 to 39.

Aspect 46. A thermally conductive part formed from the composition according to any one of Aspects 1 to 39.

Aspect 47. The part of Aspect 46, wherein the part is three-dimensionally printed.

Aspect 48. A vehicle comprising the substrate of any of Aspects 40 to 44.

Aspect 49. A vehicle comprising the part of Aspect 46 or Aspect 47.

Aspect 50. A battery pack comprising:
at least two battery cells; and
the composition of any of preceding Aspects 1 to 39 positioned between the two battery cells.

Aspect 51. The battery pack of Aspect 50, further comprising a cooling fin, a cooling plate, and/or a battery box.

Aspect 52. A circuit board comprising the composition of any of preceding Aspects 1 to 39 positioned in or on the circuit board.

Aspect 53. A method of forming an article comprising extruding the composition of any of Aspects 1 to 39.

Aspect 54. The method of Aspect 53, wherein the extruding comprising three-dimensional printing.

Aspect 55. An article formed by the method of Aspect 53 or Aspect 54.

Illustrating the invention are the following examples, which, however, are not to be considered as limiting the invention to their details. Unless otherwise indicated, all parts and percentages in the following examples, as well as throughout the specification, are by weight.

EXAMPLES

TABLE 1

Abbreviation Description of Matrix Materials

| Abbreviation or trade designation of matrix materials | Density (g/ml) | Description |
|---|---|---|
| Epon 813 | 1.13 | Bisphenol A epichlorohydrin diluted with cresyl glycidyl ether available from Hexion |
| Epon 828 | 1.16 | Bisphenol A epichlorohydrin resin available from Huntsma |
| FLEP-60 | 1.2 | Epoxy termined polysulfide polymer available from Toray Fine Chemicals (EEW: 280 g/quiv) |
| ThioplastEPS80 | 1.2 | Epoxy termined polysulfide polymer available from AkzoNobel (EEW: 281 g/equiv) |
| ThioplastEPS25 | 1.27 | Epoxy termined polysulfide polymer available from AkzoNobel (EEW: 711 g/equiv) |
| XES 1424 | 1.06 | Epoxy terminated polyether polymer available from PPG (EEW: 320 g/equiv) |
| BDGE | 1.1 | 1.4-bis(2,3 epoxypropoxy) Butane available from CVC Specialty Chemicals, Inc. |
| PEGDGE | 1.14 | Poly(ethylene glycol) diglycidyl ether polymer available from Sigma-Aldrich (EEW: 250 g/equiv) |
| PETMP | 1.28 | Pentaerythritol Tetra(3-mercaptopropionate) available from Bruno Bock Thiochemicals |
| QE-340M | 1.17 | Thiol terminated polyether polymer available from Toray Fine Chemicals |
| Di-PETMP | 1.299 | Di-pentaerythritol Tetra(3-mercaptopropionate) available from Bruno Bock Thiochemicals |
| T403 | 0.978 | Jeffamine T403 Polyetheramine (AHEW: 81 g/equiv) |
| D400 | 0.972 | Jeffamine D400 Polyetheramine (AHEW: 115 g/equiv) |
| Ancamine K54 | 0.98 | Tris-(dimethylaminomethyl) phenol available from Sigma-Aldrich |
| CEMM | 1.047 | 1-(2-Cyanoethyl)-2-ethyl-4-methylimidazole available from Sigma-Aldrich |
| Dicyandiamide | 1.4 | Dicyandiamide from TCI America |
| GPTMS | 1.07 | (3-Glycidyloxypropyl)trimethoxysilane available from Sigma-Aldrich |
| Epodil 748 | 0.89 | Alkyl c12-c14 glycidyl ether available from Air Products & Chemicals, Inc. |
| K-FLEX 500 | 1.14 | Dipropylene glycol dibenzoate/Diethylene glycol dibenzoate (ratio: 1:1 weight) avaiable from Emerald Perfomance Mateirals, LLC |
| K-FLEX 850S | 1.14 | Dipropylene glycol dibenzoate/Diethylene glycol dibenzoate avaiable from Emerald Perfomance Mateirals, LLC |
| K-FLEX 975P | 1.15 | Dipropylene glycol dibenzoate/Diethylene glycol dibenzoate/Propylene glycol dibenzoate avaiable from Emerald Perfomance Mateirals, LLC |
| Bezoflex 9-88 | 1.12 | Dipropylene glycol dibenzoate avaiable from Sigma-Aldrich |
| Silicone oil | 1 | DMS-T23 Poly(dimethylsiloxane), M.W. 13,650 g/mol, avaiable from Gelest, Inc. |
| DINP | 0.98 | Diisononyl phthalate avaiable from Exxon Mobil Chemical Company |
| PAPI 94 | 1.234 | polymethylene polyphenylisocyanate that contains MDI, which is available from DOW Chemical |
| DPG | 1.02 | Dipropylene glycol available from Sigma-Aldrich |
| Poly BD R45 HTLO | 0.901 | Hydroxyl terminated polymer of butadiene available from Hydrocarbon Specialty Chemicals |

TABLE 2

Abbreviation Description of Fillers Materials

| Abbreviation or trade designation of fillers | Particle Size (μm)* | True Density (g/ml) | Mohs Hardness | Description |
|---|---|---|---|---|
| PT100 | 13 | 2.1 | — | Boron nitride fillers available from Momentive |
| PTX60 | 55-65 | 2.1 | 2 | Boron nitride fillers available from Momentive |
| Nabalox NO625-10 | 2.5 | 3.89 | 9 | Alumina fillers available from Nabaltec AG |
| Nabalox 105RA | 80 | 3.89 | — | Alumina fillers available from Nabaltec AG |
| TFZ-N15P | 16 | 3.28 | 5 | Aluminum nitride fillers available from Toyal America, Inc. |
| TFZ-S30P | 30 | 3.28 | — | Aluminum nitride fillers available from Toyal America, Inc. |
| CTS7M | 120 | 2.1 | — | Boron nitride fillers available from Salnt-Gobaln Ceramic Materials |
| CTS25M | 300 | 2.1 | — | Boron nitride fillers available from Salnt-Gobaln Ceramic Materials |
| MgO | 0.6 | 3.58 | — | magnesium oxide fillers available from US Research Nanomaterials (600 nm) |
| UltraPflex | 0.07 | 2.71 | — | Coated precipitated calcium carbonate available from Specialty Minerals |
| Aerosil R202 | 0.014 | 2.65 | — | Hydrophobic fumed silica available from Evonik |

*Based on manufacturer's specifications

Examples 1-8

TABLE 3

Effect of different fillers on Thermal Conductivity (TC) of cured compositions

| Ex No. | Base Epoxy | Weight (g) | Hardener Thiol Compound | Weight (g) | Catalyst Tertiary Amine | Weight (g) | Conductive Fillers Filler 1 | Weight (g) | vol. % |
|---|---|---|---|---|---|---|---|---|---|
| 1 | Epon 813 | 5 | PETMP | 3.12 | Ancamine K54 | 0.03 | PTX60 | 4.33 | 23.01 |
| 2 | Epon 813 | 5 | PETMP | 3.12 | Ancamine K54 | 0.03 | PTX60 | 2.75 | 14.62 |
| 3 | Epon 813 | 5 | PETMP | 3.12 | Ancamine K54 | 0.03 | PTX60 | 2.75 | 14.65 |
| 4 | Epon 813 | 5 | PETMP | 3.12 | Ancamine K54 | 0.03 | PTX60 | 2.75 | 14.64 |
| 5 | Epon 813 | 5 | PETMP | 3.12 | Ancamine K54 | 0.03 | — | | |
| 6 | Epon 813 | 5 | PETMP | 3.12 | Ancamine K54 | 0.03 | — | | |
| 7 | Epon 813 | 5 | PETMP | 3.12 | Ancamine K54 | 0.03 | — | | |
| 8 | Epon 813 | 10 | PETMP | 6.24 | Ancamine K54 | 0.06 | — | — | — |

| Ex No. | Non-condutive fillers Filler 2 | Weight (g) | vol. % | Filler 3 | Weight (g) | vol. % | Filler Total vol. % | TC (W/mK) |
|---|---|---|---|---|---|---|---|---|
| 1 | — | — | — | — | — | — | 23.01 | 1.54 |
| 2 | Aerosil R202 | 2 | 8.43 | — | — | — | 23.05 | 0.98 |
| 3 | — | — | — | UltraPflex | 2 | 8.26 | 22.91 | 0.59 |
| 4 | Aerosil R202 | 1 | 4.22 | UltraPflex | 1 | 4.12 | 22.98 | 1.01 |
| 5 | Aerosil R202 | 5.45 | 22.99 | — | — | — | 22.99 | 0.40 |
| 6 | — | — | — | UltraPflex | 5.58 | 22.99 | 22.99 | 0.32 |
| 7 | Aerosil R202 | 2.73 | 11.50 | UltraPflex | 2.78 | 11.45 | 22.95 | 0.49 |
| 8 | — | — | — | — | — | — | — | 0.39 |

As used herein in the Examples, reference to "Base" refers to the electrophile and reference to "Base Pack" refers to the mixture of the electrophile and fillers as shown in the Tables. As used herein in the Examples, reference to "Hardener" refers to the nucleophile and reference to "Hardener Pack" refers to the mixture of the electrophile, catalyst, and fillers as shown in the Tables.

Examples 1-4 were experimental and Examples 5-8 were comparative. The compositions of Examples 1-8 were prepared using the ingredients shown in Table 3 according to the following procedure with all non-manual mixing performed using a Speedmixer DAC 600FVZ (commercially available from FlackTeck inc.). For each example, hardener was first mixed with catalyst for 1 min at 2,350 revolutions per minutes ("rpm") at room temperature. The mixture was then mixed with base and fillers (conductive fillers and non-conductive fillers) for another 1 min at 2,350 rpm. The composition was then transferred into an aluminum weighing dish (Fisherbrand, Catalog No. 08-732-101), and allowed to cure for at least 12 h at room temperature. The cured composition was removed from the aluminum weighing dish before thermal conductivity measurements were made.

The compositions of Examples 1-8 were tested for thermal conductivity using a Modified Transient Plane Source (MTPS) method (conformed to ASTM D7984) with a TCi thermal conductivity analyzer from C-Therm Technologies Ltd. The sample size was at least 20 mm by 20 mm with a thickness of 5 mm. 500 g of load was added on top of the sample to ensure a fully contact of the sample with the flat probe. Data are reported in Table 3.

The data in Table 3 demonstrate the importance of thermally conductive fillers in achieving a cured composition having a high thermal conductivity (TC) (more than 0.5 W/m·K). Examples 5-7 included only non-thermally conductive fillers (UltraPlex and Aerosil R202) and had a low TC (less than 0.5 W/m·K) when at least partially cured, in contrast, high TC (greater than 0.5 W/m·K) was achieved when thermally conductive fillers (PTX60) were used alone (Example 1) or in combination with non-thermally conductive fillers (Examples 2-4).

Examples 9-13

TABLE 4

Viscosity (measured at 1,000 Pa shear stress), Thermal Conductivity (TC) and hardness of Cured Compositions

| | Base Pack | | | | | | Hardener Pack | |
|---|---|---|---|---|---|---|---|---|
| | Base | | Fillers | | | | Hardeners | |
| Ex No. | Epoxy | Weight (g) | TCF | Weight (g) | Weight % | Viscosity (mPa·s) | Thiol Compound | Weight (g) |
| 9 | Epon 828 | 10 | PTX60 | 7.39 | 42.50 | $2.2 \cdot 10^7$ | PETMP | 6.24 |
| 10 | Epon 828 | 10 | TFZ S30P | 9.61 | 49.02 | $1.12 \times 10^5$ | PETMP | 6.24 |
| 11 | Epon 813 | 10 | NO625-10 | 18.47 | 64.87 | 3,578 | PETMP | 6.24 |
| 12 | DER732 | 8 | TFZ S30P | 10.86 | 57.58 | 2,036 | PETMP | 6.1 |
| 13 | DER732 | 8 | TFZ N15P | 10.86 | 57.58 | 623 | PETMP | 6.1 |

| | Hardener Pack | | | | | |
|---|---|---|---|---|---|---|
| | Catalyst | | Fillers | | | |
| Ex No. | Teritiary Amine | Weight (g) | TCF | Weight (g) | Weight % | Viscosity (mPa·s) |
| 9 | Ancamine K54 | 0.06 | PTX60 | 4.66 | 42.75 | $6.45 \times 10^5$ |
| 10 | Ancamine K54 | 0.06 | TFZ S30P | 6.05 | 49.23 | 4,431.90 |
| 11 | Ancamine K54 | 0.06 | NO625-10 | 11.64 | 65.10 | 8,411.20 |
| 12 | Ancamine K54 | 0.06 | TFZ S30P | 8.44 | 58.05 | 21,819 |
| 13 | Ancamine K54 | 0.06 | TFZ N15P | 8.44 | 58.05 | 5,791.90 |

| Ratio of Base to Hardener (by weight) | Mixed viscosity (mPa·s) | TC (W/mK) | Shore D Hardness | Shore A Hardness |
|---|---|---|---|---|
| 1.59 | $3.48 \times 10^6$ | 2.50 | 71.3 | — |
| 1.59 | 38,926 | 1.16 | 81.6 | — |
| 1.59 | 18,253 | 1.20 | 69.33 | — |
| 2.60 | 4,093.20 | 1.60 | 26 | 86 |
| 2.60 | 1,203 | 1.39 | 22.6 | 83 |

Examples 9-13 were experimental and were prepared using the ingredients shown in Table 4 according to the following procedure with all non-manual mixing performed using a Speedmixer DAC 600FVZ (commercially available from FlackTeck Inc.). For each example, the base pack was prepared by mixing the base with the fillers for 1 min at 2,350 rpm, and the hardener pack was prepared by mixing the hardener, the catalyst and the filler for 1 min at 2,350 rpm. For Examples 9-11, 1.59 parts of the base pack was mixed with 1 part of the hardener pack for 1 min at 2,350 rpm, while for Examples 12 and 13, 2.60 parts of the base pack was mixed with 1 part of the hardener pack for 1 min at 2,350 rpm.

Viscosity was measured at a shear stress of 1,000 using an Anton Paar MCR 301 rotational rheometer at 25° C., using a parallel plate with a diameter 25 mm. The gap was set to be 1 mm. Shear stress ramp rate: 50 Pa/s (0 to 3500 Pa). Data are reported in Table 4.

The composition was then transferred into an aluminum weighing dish (Fisherbrand, Catalog No. 08-732-101), and allowed to cure for at least 12 h at room temperature. The cured composition was removed from the aluminum weighing dish before thermal conductivity and hardness measurements were made.

Thermal conductivity of the compositions of Examples 9-13 was measured as described for Examples 1-8. Data are reported in Table 4.

After the samples were cured for at least three weeks, the compositions of Examples 9-13 were tested in accordance with ASTM D2240 standard with a Type A or Type D durometer (Model 2000, Rex Gauge Company, Inc.) at room temperature. The sample size was at least 20 mm by 20 mm with a thickness of 6 mm. Data are reported in Table 4.

Figure 2A:
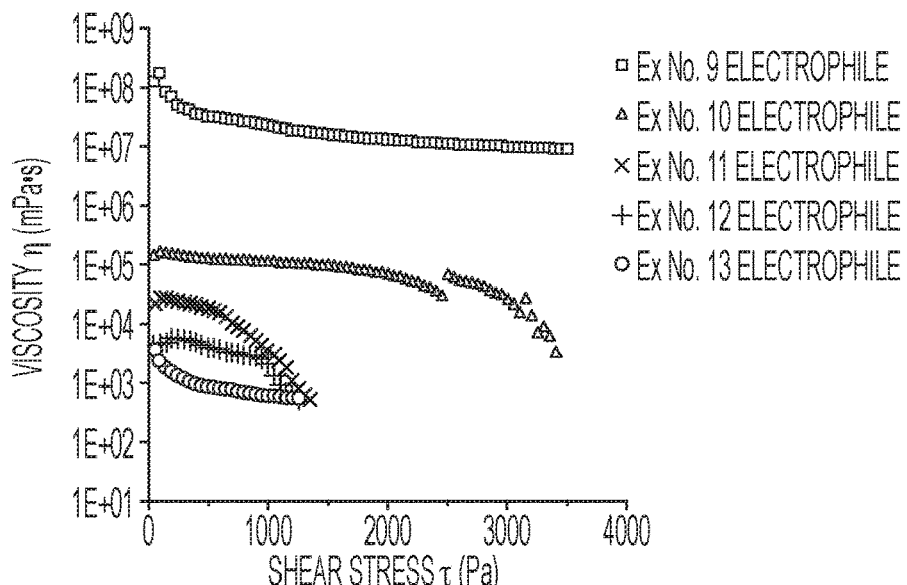
FIG. 2 illustrates the viscosity-shear stress dependence of (A) the electrophile, (B) nucleophile, and (C) the total composition of Examples 9-13 at 25° C. and a relative humidity of 31.5%.
Figure 2B:
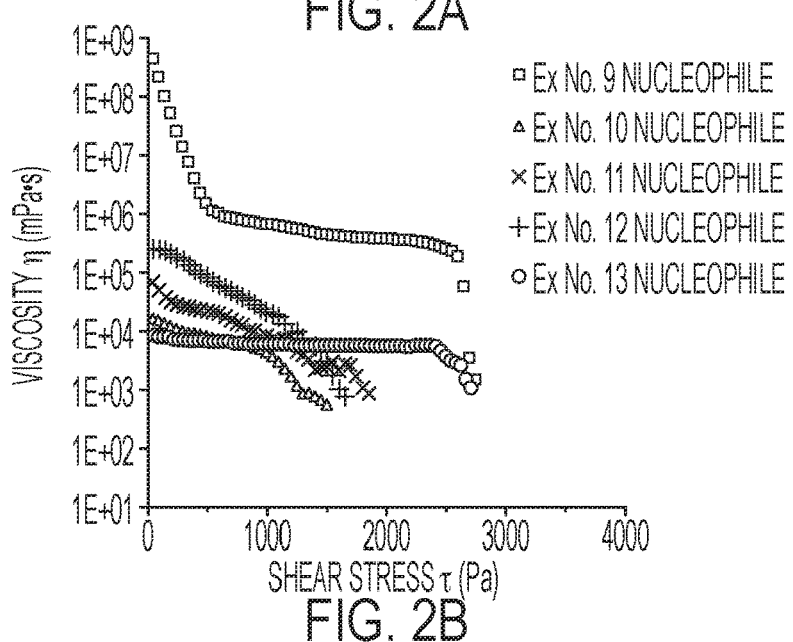
Figure 2C:
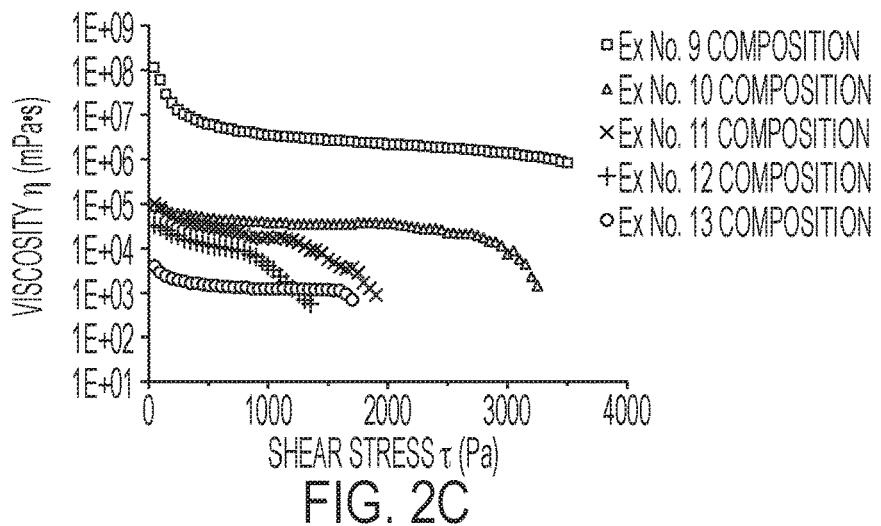

As shown in Table 4, the compositions had a pumpable rheology and the cured compositions had high TC (above 0.5 W/m·K) and tunable softness. Specifically, the viscosity of the base pack was 623 to $2.2 \times 10^7$ mPa·s, the viscosity of the hardener pack was 5,791 to $6.45 \times 10^5$ mPa·s, and the composition had a viscosity of 1,203 to $3.48 \times 10^6$ mPa·s. The cured compositions of Example 9-13 had hardnesses of 22.6 to 77 (shore D hardness) or 84 to 85.3 (shore A hardness). See FIG. 2 which shows the viscosity-shear stress dependence of an electrophile, a nucleophile, and mixtures thereof of Examples 9-13 at 25° C.

Examples 14-26

TABLE 5

Thermal Conductivity of Compositions with Hybrid fillers

| Ex No | Base Epoxy | Weight (g) | Hardener Thiol Compound | Weight (g) | Catalyst Tertiary Amine | Weight (g) | Fillers Filler 1 | Weight (g) |
|---|---|---|---|---|---|---|---|---|
| 14 | Epon 828 | 15.00 | Di-PETMP | 9.36 | Ancamine K54 | 0.09 | NO625-10 | 13.46 |
| 15 | Epon 828 | 15.00 | Di-PETMP | 9.36 | Ancamine K54 | 0.09 | NO625-10 | 20.19 |
| 16 | Epon 828 | 15.28 | Di-PETMP | 9.53 | Ancamine K54 | 0.09 | NO625-10 | 25.92 |
| 17 | Epon 828 | 10.00 | PETMP | 5.41 | Ancamine K54 | 0.06 | MgO | 5.79 |
| 18 | Epon 813 | 10.00 | PETMP | 6.24 | Ancamine K54 | 0.06 | NO625-10 | 10.20 |
| 19 | Epon 813 | 10.00 | PETMP | 6.24 | Ancamine K54 | 0.06 | PT100 | 0.91 |
| 20 | Epon 813 | 10.00 | PETMP | 6.24 | Ancamine K54 | 0.06 | PT100 | 3.33 |
| 21 | Epon 813 | 10.00 | PETMP | 6.24 | Ancamine K54 | 0.06 | PT100 | 5.00 |
| 22 | Epon 813 | 10.00 | PETMP | 6.24 | Ancamine K54 | 0.06 | PT100 | 6.66 |
| 23 | Epon 813 | 10.00 | PETMP | 6.24 | Ancamine K54 | 0.06 | PT100 | 9.1 |
| 24 | Epon 813 | 10.00 | PETMP | 6.24 | Ancamine K54 | 0.06 | PTX60 | 9.10 |
| 25 | Epon 813 | 10.00 | PETMP | 6.24 | Ancamine K54 | 0.06 | PTX60 | 9.10 |
| 26 | Epon 813 | 10.00 | PETMP | 6.24 | Ancamine K54 | 0.06 | PTX60 | 9.10 |

| Ex No | vol. % | Fillers Filler 2 | Weight (g) | vol. % | Filler total vol. % | Volume Ratio of Filler 1 to Filler 2 | TC (W/mK) |
|---|---|---|---|---|---|---|---|
| 14 | 22.20 | CTS7M | 14.53 | 11.10 | 33.30 | 2.00 | 2.10 |
| 15 | 17.00 | CTS7M | 10.90 | 17.00 | 34.00 | 1.00 | 1.84 |
| 16 | 11.10 | CTS7M | 7.27 | 22.20 | 33.30 | 0.50 | 1.58 |
| 17 | 8.96 | PTX60 | 11.00 | 26.58 | 35.54 | 0.34 | 2.27 |
| 18 | 12.12 | PTX60 | 11.00 | 24.21 | 36.33 | 0.50 | 2.58 |
| 19 | 2.34 | PTX60 | 9.1 | 23.36 | 25.70 | 0.10 | 2.37 |
| 20 | 8.55 | PTX60 | 6.68 | 17.11 | 25.68 | 0.50 | 2.02 |
| 21 | 12.84 | PTX60 | 5.00 | 12.84 | 25.68 | 1.00 | 1.07 |
| 22 | 17.11 | PTX60 | 3.33 | 8.55 | 25.66 | 2.00 | 1.61 |
| 23 | 23.36 | PTX60 | 0.91 | 2.34 | 25.70 | 10.00 | 1.51 |
| 24 | 23.36 | CTS25M | 0.91 | 2.34 | 25.70 | 10.00 | 2.44 |
| 25 | 23.36 | Nabalox NO625-10 | 1.70 | 2.36 | 25.72 | 9.92 | 2.10 |
| 26 | 23.36 | Nabalox 105RA | 1.70 | 2.36 | 25.71 | 9.92 | 2.41 |

As used herein, the term "hybrid fillers" refers to a composition having first and second, etc. thermally conductive fillers. Examples 14-26 were experimental and were prepared using the ingredients shown in Table 5 according to the following procedure with all non-manual mixing performed using a Speedmixer DAC 600FVZ (commercially available from FlackTeck inc.). For each Example, the hardener was first mixed with the catalyst for 1 min at 2,350 rpm at room temperature. Then the mixture was mixed with the base and the fillers for another 1 min at 2,350 rpm. The composition was then transferred into an aluminum weighing dish (Fisherbrand, Catalog No. 08-732-101), and allowed to cure for at least 12 h at room temperature. The cured composition was removed from the aluminum weighing dish before thermal conductivity measurements were made.

Thermal conductivity of the compositions of experimental Examples 14-27 was measured as described for Examples 1-8. Data are reported in Table 5.

As shown in Table 5, compositions that contained two thermally conductive fillers formed cured compositions having thermal conductivity above 0.5 W/m·K. For example, as shown below, the size ratio of filler 1 to filler 2 (i.e., first thermally conductive filler to second thermally conductive filler) was 0.01 to 100, and the volume ratio of filler 1 to filler 2 was 0.5 to 10. Specifically, Example 14 was a binary filler system in which the size of filler 1 (NO 625-10) was 2.5 μm and the size of filler 2 (CTS7M) was 120 μm. Examples 14-16 were binary filler systems in which the volume ratio of filler 1 (NO 625-10) to filler 2 (CTS7M) in the final composition was 2.0, 1.0, 0.5, respectively. Example 17 was a binary filler system in which the size of filler 1 (MgO) was 0.6 μm and the size of filler 2 (PTX60) was 60 μm. Example 18 was a binary filler system in which the size of filler 1 (NO 625-10) was 2.5 μm and the size of filler 2 (PTX60) was 60 μm. Examples 19-23 were binary filler systems in which the size of filler 1 (PT100) was 13 μm and the size of filler 2 (PTX60) was 60 μm. The volume ratio of filler 1 to filler 2 was 0.5, 1.0, 2.0, 10 for Example 19-23, respectively. Example 24 was a binary filler system in which the size of filler 1 (PTX60) was 60 μm and the size of filler 2 (CTS25M) was 300 μm. Example 25 was a binary filler system in which the size of filler 1 (PTX60) was 60 μm and the size of filler 2 (NO 625-10) was 2.5 μm. Finally, Example 26 was a binary filler system in which the size of filler 1 (PTX60) was 60 μm and the size of filler 2 (Nabalox 105RA) was 80 μm.

Examples 27-28

TABLE 6

Electrical properties of Cured Compositions

| Ex No. | Filler 1 TCF | Weight (g) | vol. % | Filler 2 TCF | Weight (g) | vol. % | TC (W/mK) | Dielectric strength (kV/mm) | Volume Resistivity ($\times 10^{15}$ Ω-cm)@ 1 kg |
|---|---|---|---|---|---|---|---|---|---|
| 20 | PT100 | 0.91 | 2.34 | PTX60 | 9.1 | 23.36 | 2.37 | 9.94 | 4.95 |
| 21 | PT100 | 3.33 | 8.55 | PTX60 | 6.66 | 17.11 | 2.02 | 9.87 | 3.00 |
| 22 | PT100 | 5.00 | 12.84 | PTX60 | 5.00 | 12.84 | 1.07 | 11.65 | 5.63 |
| 23 | PT100 | 6.66 | 17.11 | PTX60 | 3.33 | 8.55 | 1.61 | 10.00 | 4.75 |
| 24 | PT100 | 9.1 | 23.36 | PTX60 | 0.91 | 2.34 | 1.51 | 10.24 | 7.02 |
| 25 | PTX60 | 9.10 | 23.36 | CTS25M | 0.91 | 2.34 | 2.44 | 11.85 | 4.16 |
| 26 | PTX60 | 9.10 | 23.36 | Nabalox NO625-10 | 1.70 | 2.38 | 2.10 | 14.86 | 8.84 |
| 27 | PTX60 | 9.10 | 23.36 | Nabalox 105RA | 1.70 | 2.36 | 2.41 | 10.83 | 0.77 |
| 28 | TFZ N15P | 15.60 | 25.66 | — | — | — | 1.45 | 10.41 | 8.26 |
| 29 | MgO | 17.00 | 25.63 | — | — | — | 0.95 | 8.90 | 8.18 |

Examples 27-28 were experimental and were prepared using the ingredients shown in Table 6. 6.24 g of PETMP ("Hardener") was mixed with 0.06 g of Ancamine K54 ("Catalyst") using a Speedmixer DAC 600FVZ (commercially available from FlackTeck inc.) for 1 min at 2,350 rpm. Then the mixture was mixed for 1 min at 2,350 rpm with Epon 813 ("Base") and 15.6 g of TFZ N15P (Example 27) or 17 g of MgO (Example 28).

For thermal conductivity measurement, the composition was then transferred into an aluminum (Al) weighing dish (Fisherbrand, Catalog No. 08-732-101), and allowed to cure for at least 12 h at room temperature. Then the Al dish was removed from the cured compositions. For electrical properties measurement, the composition was drawn down with a 1 mm thick drawdown bar over a woven Teflon baking sheet secured to a steel 4"×12" panel. The film was allowed to cure for at least 12 h before they were peeled off before tests.

Volume resistivity measurement. The test was performed according to ASTM D257 standard on a Keysight B2987A Electrometer/High Resistance Meter connected to a 16008B Resistivity Cell. The sample was slid on top of the circular measurement electrode (effective area (EAR): 28.27 cm$^2$ in surface area) and under the square metal plate that comprise the inside of the 16008B Resistivity Cell. The sample size was at least 70 mm by 70 mm which was sufficient to cover the effective area of test electrode. The thickness of the samples (STH) were measured by a caliper (Mitutoyo, Quickmike Series 293-IP-54 ABSOLUTE Digimatic Micrometer). Desired weight (1 kg) was applied onto the sample during the resistance measurement to ensure a fully contact between the electrode and the sample. The applied voltage was 500 volts and volume resistance (Rv) at room temperature was recorded once the instrument stops staking resistance measurements. The volume resistivity ($\rho v$) was obtained by $\rho v = Rv \times EAR/STH$.

Dielectric strength measurement. The breakdown voltage of the samples under direct current was measured on a dielectric meter (Sefelec RMG12AC-DC) connected to two copper electrodes with 1 inch diameter. The leakage current limit was set to be 0.2 mA. The sample was at least 70 mm by 70 mm. The thickness of the sample was measured by a caliper (Mitutoyo, Quickmike Series 293-IP-54 ABSOLUTE Digimatic Micrometer). For each sample, dielectric strength of at least five different places was measured and then averaged to obtain the dielectric strength of each sample.

The data in Table 6 demonstrated that the cured compositions of Examples 19-28 were highly thermally conductive (TC above 0.5 W/m·K), and also were electrically isolative. Specifically, Examples 20-27 were binary filler systems whose dielectric strength were 9.87 kV/mm to 14.86 kV/mm and volume resistivity were 0.77×10$^{15}$ Ω-cm to 8.84×10$^{15}$ Ω-cm. Example 28 was a single filler system which had a dielectric strength of 10.41 kV/mm and a volume resistivity of 8.25×10$^{15}$ Ω-cm, and Example 29 was a single filler system which had a dielectric strength of 6.9 kV/mm and a volume resistivity of 8.18×10$^{15}$ Ω-cm.

Examples 29-32 and 37-38

TABLE 7

Effect of Matrix Materials on TC of Cured Compositions

| Ex No. | Base Epoxy | Weight (g) | Hardener Thiol Compound | Weight (g) | Hardener Amino Compound | Weight (g) | Catalyst Tertiary Amine | Weight (g) |
|---|---|---|---|---|---|---|---|---|
| 29 | FLEP-60 | 11.2 | PETMP | 4.99 | — | — | Ancamine K54 | 0.06 |
| 30 | Thioplast EPS80 | 11.33 | PETMP | 4.86 | — | — | Ancamine K54 | 0.06 |
| 31 | Thioplast EPS25 | 13.78 | PETMP | 2.42 | — | — | Ancamine K54 | 0.06 |
| 32 | Epon 828 | 5 | QE-340M | 5.98 | — | — | Ancamine K54 | 0.06 |
| 33 | Epon 828 | 10 | — | — | T403 | 6.3 | — | — |
| 34 | Epon 828 | 10 | — | — | D400 | 5 | — | — |
| 35 | Epon 828 | 10 | PETMP | 3 | T403 | 2 | Ancamine K54 | 0.06 |

TABLE 7-continued

Effect of Matrix Materials on TC of Cured Compositions

| 36 | Epon 813 | 10 | PETMP | 5 | — | — | Ancamine K54 | 0.06 |
| 37 | Epon 813 | 10 | PETMP | 6.24 | — | — | Ancamine K54 | 0.06 |
| 38 | Epon 813 | 5.1 | PETMP | 6.24 | — | — | Ancamine K54 | 0.06 |

| | | Filler | | | | |
|---|---|---|---|---|---|---|
| Ex No. | Epoxy No./H No. | TCF | Weight (g) | vol. % | TC (W/mK) | Shore D Hardness |
| 29 | 0.98 | PTX60 | 11 | 28.27 | 2.63 | 57.3 |
| 30 | 0.99 | PTX60 | 11 | 28.26 | 2.48 | 24 |
| 31 | 1.11 | PTX60 | 11 | 29.05 | 1.92 | — |
| 32 | 0.95 | PTX60 | 7.44 | 27.2 | 2.46 | — |
| 33 | 0.68 | PTX60 | 11 | 25.99 | 1.17 | 71.3 |
| 34 | 1.21 | PTX60 | 10 | 25.7 | 2.005 | 60.6 |
| 35 | 1.07 | PTX60 | 10.3 | 27.52 | 2.04 | — |
| 36 | 1.33 | PTX60 | 10.2 | 27.84 | 2.96 | 53.3 |
| 37 | 1.03 | PTX60 | 11 | 27.84 | 2.7 | 63.6 |
| 38 | 0.5 | PTX60 | 9.3 | 27.87 | 2.91 | — |

Examples 29-32 and 37, 38 were experimental and were prepared according to the following procedure with all non-manual mixing performed using a Speedmixer DAC 600FVZ (commercially available from FlackTeck Inc.). For each example, the hardener was first mixed with catalyst for 1 min at 2,350 rpm at room temperature. Then, the mixture was mixed with base and fillers for another 1 min at 2,350 rpm. The composition was then transferred into an aluminum (Al) weighing dish (Fisherbrand, Catalog No. 08-732-101), and allowed to cure for at least 12 h at room temperature. Then the Al dish was removed from the cured samples.

Examples 33 and 34

Examples 33 and 34 were experimental. For each example, hardener was mixed with base and fillers using a Speedmixer DAC 600FVZ (commercially available from FlackTeck inc.) for 1 min at 2,350 rpm at room temperature. The composition was then transferred into an aluminum (Al) weighing dish (Fisherbrand, Catalog No. 08-732-101), and allowed to cure for at least 12 h at 60° C. Then the Al dish was removed from the cured samples.

Thermal conductivity of the compositions of Examples 29-38 was measured as described for Examples 1-8. Hardness of cured compositions prepared from Examples 29-38 was tested as described for Examples 9-13. Data are reported in Table 7.

The data in Table 7 illustrate that various epoxy resins may be used to make the compositions of the present invention. For example, the base (epoxy) can be polysulfide-based epoxy and aromatic epoxy. For example, the hardeners (curatives) can be tetrathiol, polythiol, or amines.

Specifically, experimental Examples 29-31 were made using epoxy terminated polysulfide (FLEP-60, ThioplastEPS80, ThioplastEPS25) with tetrathiol hardener (PETMP). These epoxies have different molecular weight which affected the hardness of the cured compositions. As shown in Table 7, the cured composition of Example 29 (shore D hardness 57.3) was harder than Example 30 (shore D hardness 24).

Example 32 was prepared from Epon 828 (an aromatic epoxy) and QE-340M (a polythiol). Examples 33 and 34 were prepared from Epon 828 and amino compounds (nucleophile) (T403 and D400) and were cured at elevated temperature (60° C.). Example 35 was prepared by using a mixture of thiol and amino agents as curatives. Examples 36 to 38 were prepared from Epon 813 and thiol (PETMP). The ratio of Epon 813 to PETMP was 1.33, 1.03 and 0.5 for example 36 to 38, respectively.

Examples 39-44

TABLE 8

Effect of Additives on TC of Cured Compositions

| | Base | | Hardeners | | Catalyst | | Additives | | | Fillers | | | |
|---|---|---|---|---|---|---|---|---|---|---|---|---|---|
| Ex No. | Epoxy | Weight (g) | Thiol Compound | Weight (g) | Tertiary Amine | Weight (g) | — | Weight (g) | Weight % | TCF | Weight (g) | vol. % | TC (W/mK) |
| 39 | Epon 828 | 9.00 | PETMP | 6.24 | Ancamine K54 | 0.06 | Epodil 748 | 3.85 | 20.10 | PTX60 | 11.90 | 27.22 | 2.47 |
| 40 | Epon 828 | 9.00 | PETMP | 5.62 | Ancamine K54 | 0.06 | Bezoflex 9-88 | 1.60 | 9.83 | PTX60 | 11.00 | 27.20 | 1.88 |
| 41 | Epon 828 | 9.00 | PETMP | 5.62 | Ancamine K54 | 0.06 | DINP | 1.60 | 9.83 | PTX60 | 11.00 | 27.64 | 2.38 |
| 42 | Epon 828 | 9.00 | PETMP | 5.62 | Ancamine K54 | 0.06 | K-FLEX 500 | 1.60 | 9.83 | PTX60 | 11.00 | 27.98 | 2.04 |
| 43 | Epon 828 | 9.00 | PETMP | 5.62 | Ancamine K54 | 0.06 | K-FLEX 975P | 1.60 | 9.83 | PTX60 | 11.00 | 28.00 | 1.41 |
| 44 | Epon 828 | 9.00 | PETMP | 5.62 | Ancamine K54 | 0.06 | Silicone oil | 1.60 | 9.83 | PTX60 | 11.00 | 27.64 | 2.40 |

Examples 39-44 were experimental and were prepared according to the following procedure with all non-manual mixing performed using a Speedmixer DAC 600FVZ (commercially available from FlackTeck inc.). For each example, the hardener was first mixed with catalyst for 1 min at 2,350 revolutions per minutes ("rpm") at room temperature. The mixture was then mixed with base, filler, and additive for another 1 min at 2,350 rpm. The composition was then transferred into an aluminum (Al) weighing dish (Fisherbrand, Catalog No. 08-732-101), and allowed to cure for at least 12 h at room temperature. Then the Al dish was removed from the cured samples before tests.

Thermal conductivity of the compositions of Examples 39-44 was measured as described for Examples 1-8. Data are reported in Table 8 and illustrate the thermal conductivity of compositions including a reactive diluent (Example 39), plasticizer (Example 40 to 43) and silicone oil (Example 44).

Examples 45

TABLE 9

Polyurethane based TC Compositions

| | Base | | Hardener | | | | Filler | | |
|---|---|---|---|---|---|---|---|---|---|
| Ex No. | Isocyanate | Weight (g) | Hardener 1 | Weight (g) | Hardener 2 | Weight (g) | TCF | Weight (g) | TC (W/mK) |
| 45 | PAPI 94 | 4.2 | DPG | 0.3 | Poly BD R45 HTLO | 3.8 | PTX60 | 8 | 1.6 |

Experimental Example 45 was prepared according to the following procedure with all non-manual mixing performed using a Speedmixer DAC 600FVZ (commercially available from FlackTeck inc.). Hardener was mixed with base and filler for 1 min at 2,350 rpm. The composition was then transferred into an aluminum (Al) weighing dish (Fisherbrand, Catalog No. 08-732-101), and allowed to cure for at least 24 h at room temperature. Then the Al dish was removed from the cured samples before tests.

Thermal conductivity of the composition of Example 45 was measured as described for Examples 1-8. Data are reported in Table 9 and illustrate the thermal conductivity of a cured composition prepared from a polyurethane-based composition.

Examples 46 and 47

TABLE 10

Viscosity Comparison of Unfilled and Filled System

| | Base | | Hardener | | Filler | | | Viscosity of Unfilled | Viscosity of Filled | |
|---|---|---|---|---|---|---|---|---|---|---|
| Ex. No. | Epoxy | Weight (g) | Amino Compound | Weight (g) | TCF | Weight (g) | vol. % | Mixture (mPa · s) | Mixture (mPa · s) | TC (W/mK) |
| 46 | HyPox DA323 | 7.6 | Hypro 1300X16ATBN | 11.25 | TFZ N15P | 26.20 | 29.7 | $1.0 \times 10^6$ | $2.13 \times 10^7$ | 0.77 |
| 47 | BDGE | 7.60 | T403 | 6.00 | TFZ N15P | 20 | 31.7 | 328.3 | 551.04 | 2.66 |

The cured samples were prepared according to the following procedure with all non-manual mixing performed using a Speedmixer DAC 600FVZ (commercially available from FlackTeck inc.). For each example, hardener was mixed with base and filler for 1 min at 2,350 rpm. The composition was then transferred into an aluminum (Al) weighing dish (Fisherbrand, Catalog No. 08-732-101), and allowed to cure at 60° C. for at least 12 h. Then the Al dish was removed from the cured samples before tests.

Viscosity was measured using an Anton Paar MCR 301 rotational rheometer at 25° C., using a parallel plate with a diameter 25 mm. The gap was set to be 1 mm. Shear stress ramp rate: 50 Pa/s (0 to 3500 Pa). Viscosity data at a shear stress of 800 Pa are reported in Table 10.

Thermal conductivity of the composition of Examples 46 and 47 was measured as described for Examples 1-8. Data are reported in Table 9 and illustrate the viscosity difference of unfilled and filled systems.

Examples 48 and 49

TABLE 11

Thermal conductivity and electrical properties of hybrid filler system using electrically conductive and electrically isolative particles

| | Base | | Hardener | | Catalyst | | Fillers | | | | | |
|---|---|---|---|---|---|---|---|---|---|---|---|---|
| Ex. No. | Epoxy | Weight (g) | Thiol Compound | Weight (g) | Tertiary Amine | Weight (g) | Filler 1 | Weight (g) | vol. % | Filler 2 | Weight (g) | vol. % |
| 48 | TMPTGE | 21.37 | PETMP | 18.62 | Ancamine K54 | 0.04 | PTX60 | 20.00 | 20.46 | TB-17 | 9.00 | 8.53 |
| 49 | TMPTGE | 17.26 | PETMP | 15.00 | Ancamine K54 | 0.06 | PTX60 | 20.00 | 24.46 | Copper | 24.30 | 6.97 |

| Filler total vol. % | Volume Percentage of Filler 1 in total fillers | TC (W/mK) | Volume Resistivity ($\times 10^{15}$ Ω-cm)@ 1 kg |
|---|---|---|---|
| 28.99 | 70.57 | 2.56 | 0.68 |
| 31.43 | 77.84 | 3.29 | 12.70 |

The cured samples were prepared according to the following procedure with all non-manual mixing performed using a Speedmixer DAC 600FVZ (commercially available from FlackTeck inc.). For each example, hardener was mixed with base and filler for 1 min at 2,350 rpm. The composition was then transferred into an aluminum (Al) weighing dish (Fisherbrand, Catalog No. 08-732-101), and allowed to cure at room temperature for at least 12 h. Then the Al dish was removed from the cured samples before tests.

Thermal conductivity of the composition of Examples 48 and 49 were measured as described for Examples 1-8. Volume resistivity of the composition of Examples 48 and 49 were measured as described for Examples 20-29. Data are reported in Table 11 and illustrate the thermal conductivity and electrical insulating property of a cured composition prepared using a mixture of electrically conductive fillers with a thermally conductive, non-electrically conductive fillers.

Examples 50 and 51

TABLE 12

Thermal conductivity and viscosity of one-component system

| | Base | | Hardener | | Catalyst | | Dispersant | | |
|---|---|---|---|---|---|---|---|---|---|
| Ex No. | Epoxy | Weight (g) | Amine | Weight (g) | Imidazole | Weight (g) | Type | Weight (g) | Vol. % of total resin |
| 50 | Epon 883 | 104.36 | Dicyandiamine | 2.16 | CEMM | 4.28 | — | — | — |
| 51 | Epon 828 | 102.36 | Dicyandiamine | 2.16 | CEMM | 4.28 | Disperbyk 111 | 2.00 | 1.80 |

| Fillers | | | | |
|---|---|---|---|---|
| TCF | Weight (g) | vol. % | TC (W/mK) | Viscosity (cp at 25° C.) |
| Nabalox NO625-10 | 280.00 | 43.35 | 1.70 | $2.45 \times 10^6$ |
| Nabalox NO625-10 | 280.00 | 43.34 | 1.78 | $1.55 \times 10^5$ |

The cured samples were prepared according to the following procedure with all non-manual mixing performed using a Speedmixer DAC 600FVZ (commercially available from FlackTeck inc.). For each example, hardener was mixed with filler for 1 min at 2,350 rpm. Then hardener and catalyst was added the mixture and mixed for 15 sec at 1800 rpm to avoid heat generation. The viscosity of each sample was measured at room temperature using an Anton Paar MCR 301 rotational rheometer at 25° C., using a parallel plate with a diameter 25 mm. The gap was set to be 1 mm. Shear stress ramp rate: 50 Pa/s (0 to 3500 Pa). Viscosity data at a shear stress of 800 Pa are reported in Table 12. While the addition of an additional 3 g of Aerosil R202 was attempted in Example 50, the viscosity of the sample was too high and could not be achieved. 30 g of composition was then transferred into an aluminum (Al) weighing dish (Fisherbrand, Catalog No. 08-732-101), and allowed to cure at 120° C. for 0.5 h. Then the Al dish was removed from the cured samples before tests.

Thermal conductivity of the composition of Examples 50 and 51 were measured as described for Examples 1-8. Data are reported in Table 12 and illustrate the thermal conductivity of a cured composition based on one-component system and demonstrate the importance of a dispersant to achieve low viscosity of the system, even using small-sized, spherical thermally conductive particles.

Examples 52 and 53

TABLE 13

Thermal conductivity and lap shear strength of two-component system

| | Base Pack | | | | | | | | |
|---|---|---|---|---|---|---|---|---|---|
| | Base | | Fillers | | Dispersant | | Rheology Modifier | | |
| Ex. No. | Epoxy | Weight (g) | TCF | Weight (g) | Type | Weight (g) | Silica | Weight (g) | |
| 52 | DER732 | 10.1 | TFZ N15P | 19 | Anti-terra U-100 | 0.19 | Aerosil R202 | 0.63 | |
| 53 | DER732 | 10.1 | TFZ N15P | 19 | Anti-terra U-100 | 0.19 | Aerosil R202 | 0.63 | |

| Base Pack | | | | | | | | | |
|---|---|---|---|---|---|---|---|---|---|
| Hardener | | Fillers | | Catalyst | | Dispersant | | Rheology Modifier | Lap shear |
| Thiol | Weight (g) | TCF | Weight (g) | Amine | Weight (g) | Type | Weight (g) | Silica | Weight (g) | strengt (MPa) | TC (W/mK) |
| TMPMP | 5.28 | TFZ N30P | 8.8 | Ancamine K54 | 0.04 | Anti-terra U-100 | 0.13 | Aerosil R202 | 0.44 | 0.2 | — |
| TMPMP | 3.6 | TFZ N30P | 6 | Ancamine K54 | 0.03 | Anti-terra U-100 | 0.09 | Aerosil R202 | 0.3 | 0.76 | 1.7 |

The cured samples were prepared according to the following procedure with all non-manual mixing performed using a Speedmixer DAC 600FVZ (commercially available from FlackTeck inc.). For each example, hardener was mixed with base and filler for 1 min at 2,350 rpm. The composition was then transferred into an aluminum (Al) weighing dish (Fisherbrand, Catalog No. 08-732-101), and allowed to cure at room temperature for 20 hours followed by 160 F for another 4 hours. Then the Al dish was removed from the cured samples before tests.

Lap joint specimens were prepared on 1.2 mm thick A16111-T4 aluminum in accordance with ASTM D1002-10. Prior to bonding, the aluminum substrate was cleaned with acetone.

Thermal conductivity of the composition of Examples 52 and 53 were measured as described for Examples 1-8. Data are reported in Table 13 and illustrate the thermal conductivity and weak bonding strength of a cured composition and demonstrate that the 2K system may optionally be heated.

We claim:

1. A composition, comprising:
an electrophile comprising a first functional group comprising an epoxide functional group and/or an isocyanate functional group in an amount of 1% by volume to 90% by volume based on total volume of the composition;
a nucleophile comprising a second functional group comprising a thiol functional group, an amine functional group, and/or a hydroxyl functional group in an amount of 1% by volume to 90% by volume based on total volume of the composition, wherein the second functional group is capable of reacting with the first functional group; and
a thermally conductive filler package comprising thermally conductive, electrically insulative filler particles, the thermally conductive, electrically insulative filler particles having a thermal conductivity of at least 5 W/m·K, as measured according to ASTM D7984, and a volume resistivity of at least 10 Ω·m, as measured according to ASTM D257, the thermally conductive, electrically insulative filler particles being present in an amount of at least 90% by volume based on total volume of the filler package;
wherein the thermally conductive filler package is present in an amount of at least 30% by volume to no more than 98% by volume based on total volume of the composition; and
wherein the composition has a viscosity of $10^3$ cP to $10^8$ cP at a shear stress of 800 Pa as measured by an Anton Paar MCR 301 rotational rheometer at 25° C. using a parallel plate with a diameter of 25 mm (1 mm gap).

2. The composition of claim 1, wherein the nucleophile is blocked or encapsulated.

3. The composition of claim 1, wherein the nucleophile is unblocked or unencapsulated.

4. The composition of claim 1, wherein the filler package further comprises:
(a) thermally conductive, electrically conductive filler particles having a thermal conductivity of at least 5 W/m·K, as measured according to ASTM D7984, and a volume resistivity of less than 10 Ω·m as measured according to ASTM D257, the thermally conductive, electrically conductive filler particles being present in an amount of no more than 10% by volume based on total volume of the filler package; and/or (b) non-thermally conductive, electrically insulative filler particles having a thermal conductivity of less than 5 W/m·K, as measured according to ASTM D7984, and a volume resistivity of at least 10 Ω·m, as measured according to ASTM D257, the thermally conductive, electrically conductive filler particles being present in an amount of no more than 1% by volume based on total volume of the filler package.

5. The composition of claim 1, wherein the thermally conductive, electrically conductive filler particles have an average particle size in at least one dimension of no more than 5 µm, as measured using SEM.

6. The composition of claim 1, wherein the composition further comprises a dispersant, a catalyst, a rheology modifier, a solvent, a plasticizer, an adhesion promoter, an antioxidant, a water scavenger, a thixotrope, a colorant, a tint, an elastomer, a tackifier, a thermoplastic polymer, an accelerator, a silyl terminated polymer, a reactive diluent, a silane, a silane terminated polymer, elastomeric particles, or combinations thereof.

7. The composition of claim 1, wherein the composition comprises a total solids content of 10% by volume to 100% by volume based on total volume of the composition.

8. The composition of claim 1, wherein the composition comprises a one-component composition, a two-component composition, a gap filler composition, a sealant composition, an adhesive composition, a putty, and/or a three-dimensionally printable composition.

9. A method for treating a substrate comprising:
   contacting a surface of the substrate with the composition of claim 1; and
   optionally exposing the substrate to a temperature of 250° C. or less.

10. A substrate comprising a surface at least partially coated with a layer formed from the composition of claim 1.

11. The substrate of claim 10, further comprising a film, a second layer, or a coating positioned between the substrate surface and the layer formed from the composition and/or positioned over the layer formed from the composition.

12. The substrate of claim 10, wherein the layer formed from the composition, in an at least partially cured state, has at least one of the following:
   (a) a thermal conductivity of at least 0.5 W/m·K, as measured according to ASTM D7984;
   (b) a volume resistivity of at least $1 \times 10^9$ Ω·m, as measured according to ASTM D257;
   (c) a dielectric strength of at least 1 kV/mm measured according to ASTM D149 on a dielectric meter connected to two copper electrodes with 1 inch diameter;
   (d) a shore A hardness 5 to 95 measured according to ASTM D2240 with a Type A durometer at room temperature;
   (e) a shore D hardness of 5 to 95 measured according to ASTM D2240 standard with a Type D durometer at room temperature;
   (f) a shore OO hardness of less than 90 measured according to ASTM D2240 with a Type OO durometer;
   (g) a lap shear strength of at least 0.5 MPa, as measured according to ASTM D1002-10 using an Instron 5567 machine in tensile mode with a pull rate of 1 mm per minute; and/or
   (h) a butt joint test strength of 0.001 N/mm$^2$ to 500 N/mm$^2$, as measured according to ASTM D2095.

13. A vehicle comprising the substrate of claim 10.

14. A thermally conductive part comprising the substrate of claim 10.

15. A battery pack comprising:
   at least two battery cells; and
   the composition of claim 1 positioned between the two battery cells.

16. The battery pack of claim 15, further comprising a cooling fin, a cooling plate, and/or a battery box.

17. A circuit board comprising the composition of claim 1 positioned in or on the circuit board.

18. A method of forming an article comprising extruding the composition of claim 1 onto a substrate.

19. The method of claim 18, wherein the extruding comprising three-dimensional printing.

20. An article formed by the method of claim 18.

* * * * *